(12) United States Patent
Kishi

(10) Patent No.: US 7,466,899 B2
(45) Date of Patent: Dec. 16, 2008

(54) IMAGE PLAYBACK APPARATUS AND METHOD

(75) Inventor: Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1279 days.

(21) Appl. No.: 10/441,050

(22) Filed: May 20, 2003

(65) Prior Publication Data

US 2003/0231865 A1     Dec. 18, 2003

(30) Foreign Application Priority Data

May 31, 2002 (JP) .............................. 2002-160392
Apr. 21, 2003 (JP) .............................. 2003-116049

(51) Int. Cl.
*H04N 5/91* (2006.01)

(52) U.S. Cl. ................ 386/68; 386/109; 386/69; 386/70; 386/95; 386/98; 386/125; 386/111

(58) Field of Classification Search .............. 386/68, 386/69, 109, 46, 70, 95, 98, 111, 125
See application file for complete search history.

(56) References Cited

U.S. PATENT DOCUMENTS 7,263,276 B2 *   8/2007  Ando et al. .................... 386/68
7,283,725 B2 * 10/2007  Ando et al. .................... 386/68
7,295,757 B2 * 11/2007  Green .......................... 386/68
7,308,189 B2 * 12/2007  Ando et al. .................... 386/68
7,340,150 B2 *  3/2008  Mishima et al. ............... 386/68
2001/0033620 A1 10/2001  Itokawa ................. 375/240.28

FOREIGN PATENT DOCUMENTS

| JP | 8-163494   | 6/1996 |
| JP | 9-139943   | 5/1997 |
| JP | 2001-54066 | 2/2001 |
| JP | 2002-10216 | 1/2002 |

* cited by examiner

*Primary Examiner*—Thai Tran
*Assistant Examiner*—Helen Shibru
(74) *Attorney, Agent, or Firm*—Fitzpatrick, Cella, Harper & Scinto

(57) ABSTRACT

An image playback apparatus of digital moving image data has a normal playback designation unit for designating playback of image in a normal playback mode, a quick playback designation unit for designating playback of image in a quick playback mode, a to-be-decoded tile determination unit which selects a portion of each frame image indicated by the digital moving image data when the quick playback is designated, a processing unit which executes a playback process for display of digital moving image data corresponding to the portion selected by the to-be-decoded tile determination unit, and a display processing unit which makes display of the processed digital moving image data by said processing unit on a display capable of operating at a plurality of display frequencies.

11 Claims, 38 Drawing Sheets

MEDIUM

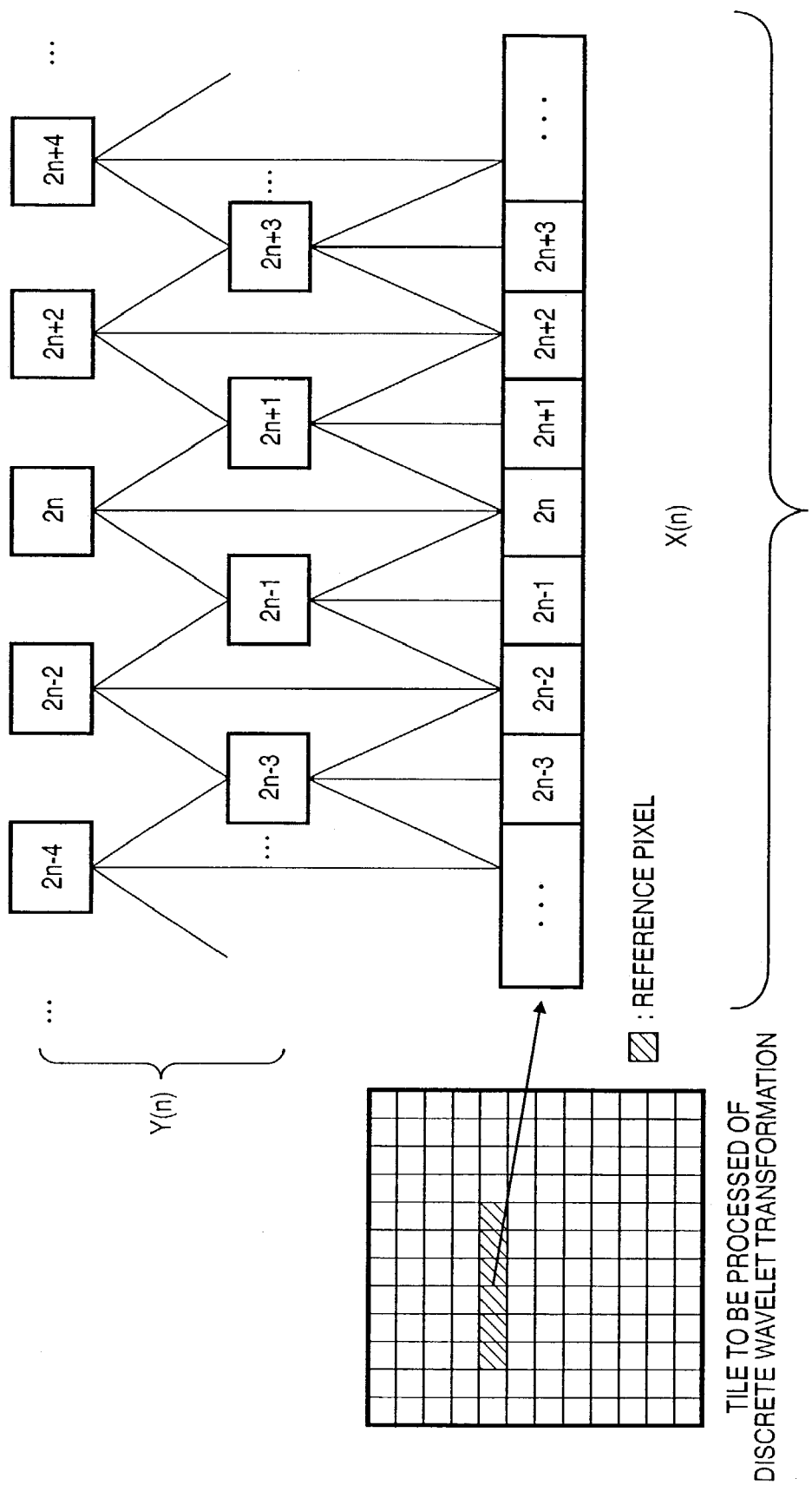

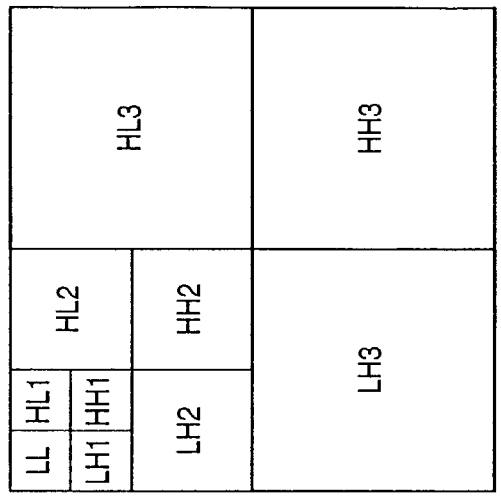
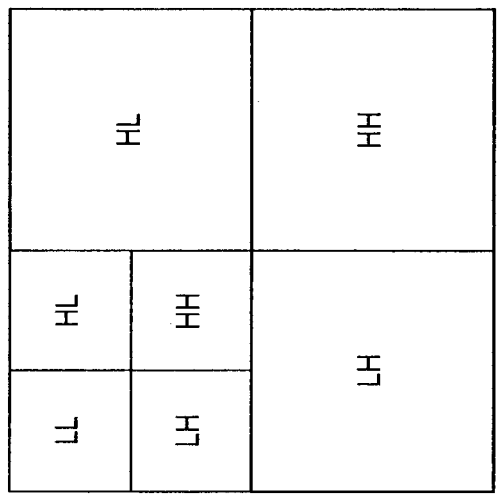
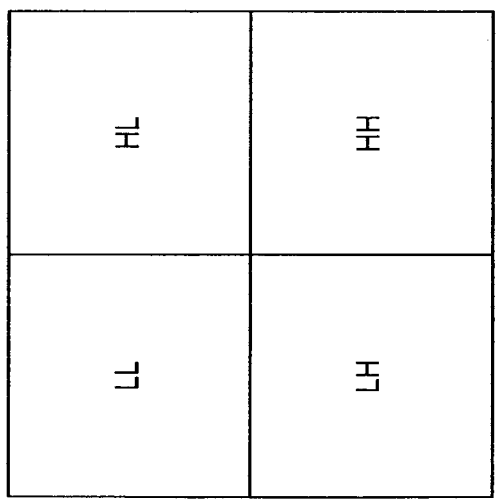

FIG. 11

| FREQUENCY COMPONENT | QUANTIZATION STEP |
|---|---|
| LL | 1 |
| HL1 | 2 |
| HH1 | 2 |
| LH1 | 2 |
| HL2 | 4 |
| HH2 | 4 |
| LH2 | 4 |
| HL3 | 8 |
| HH3 | 8 |
| LH3 | 8 |

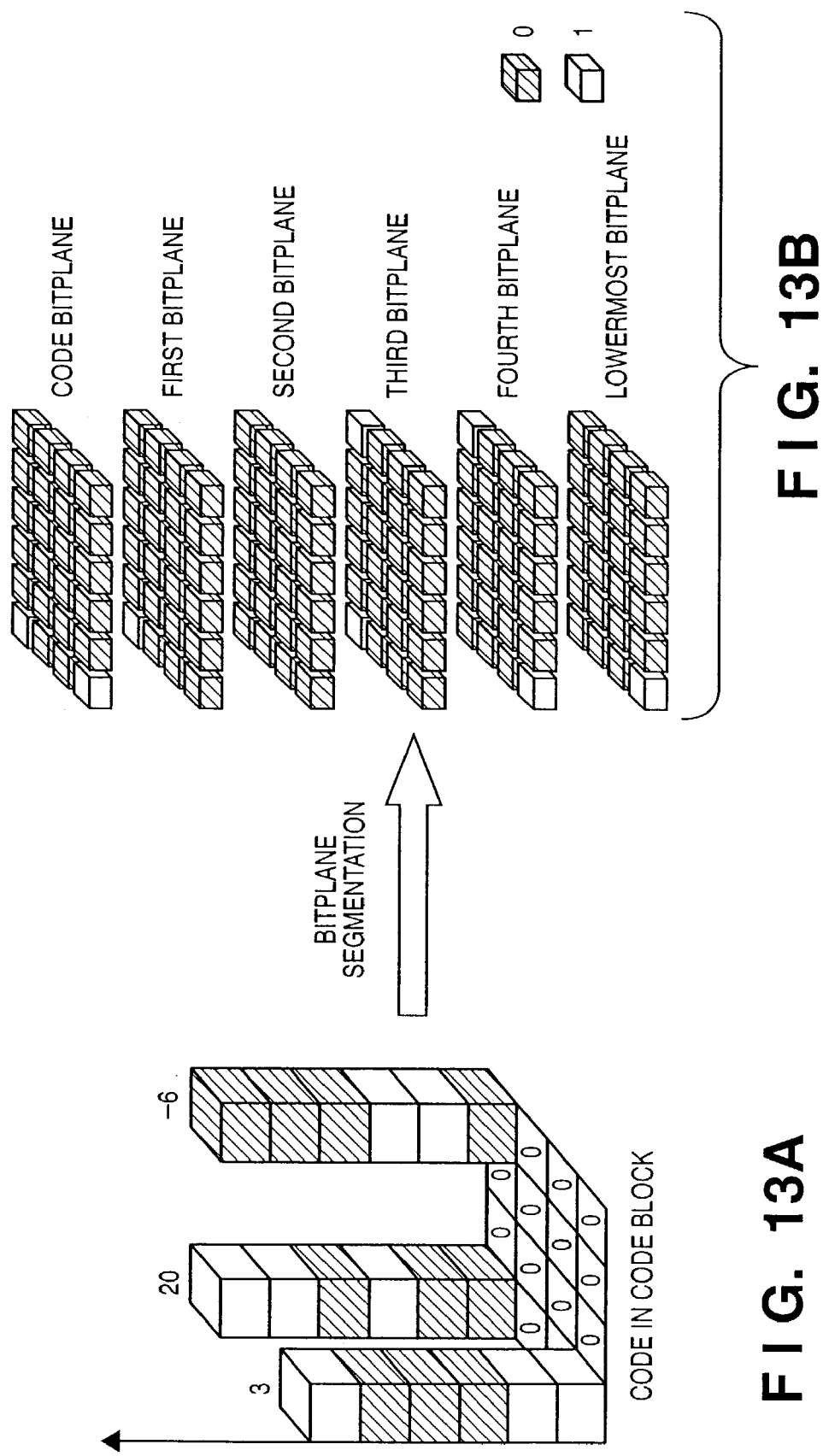

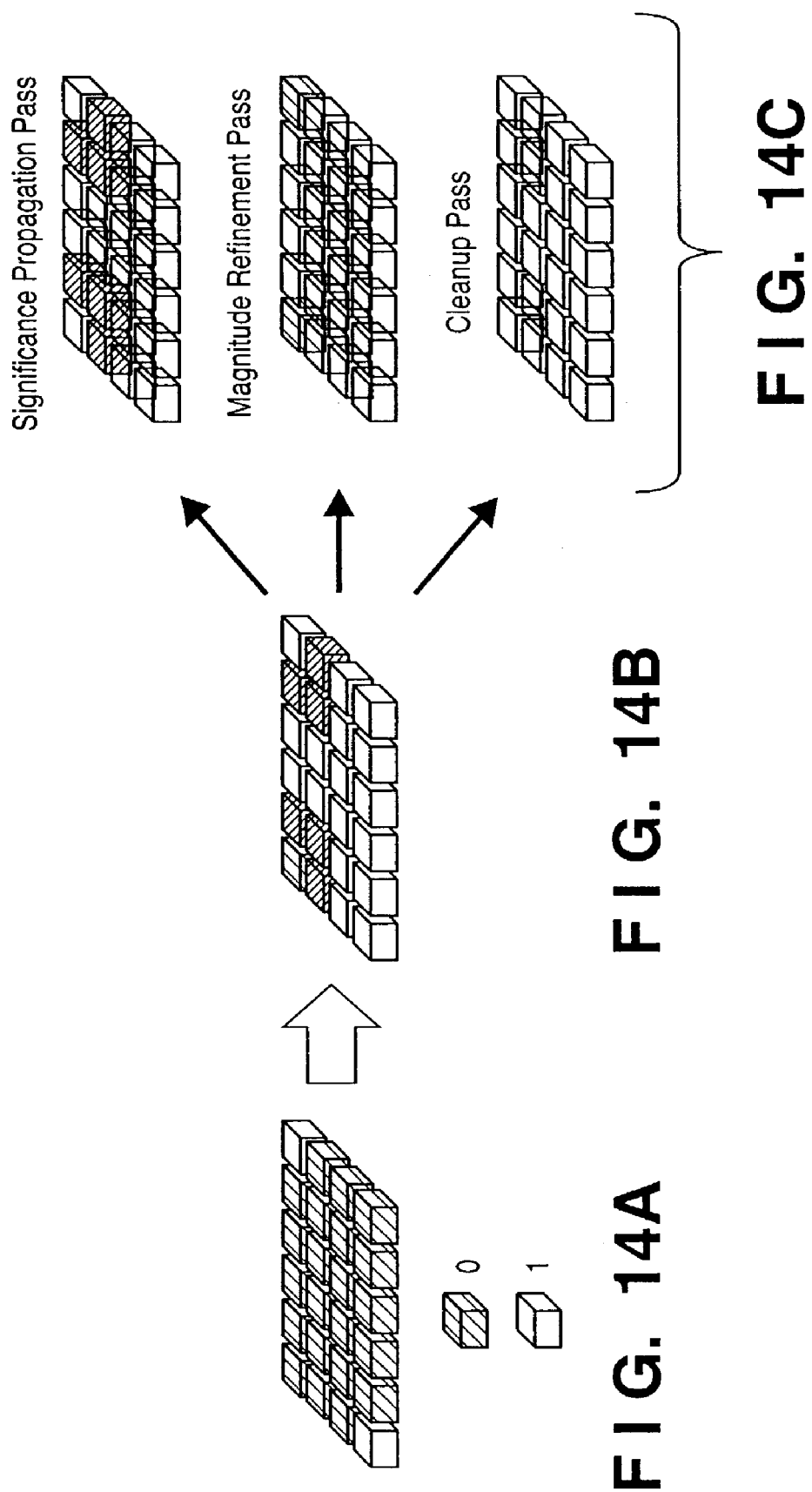

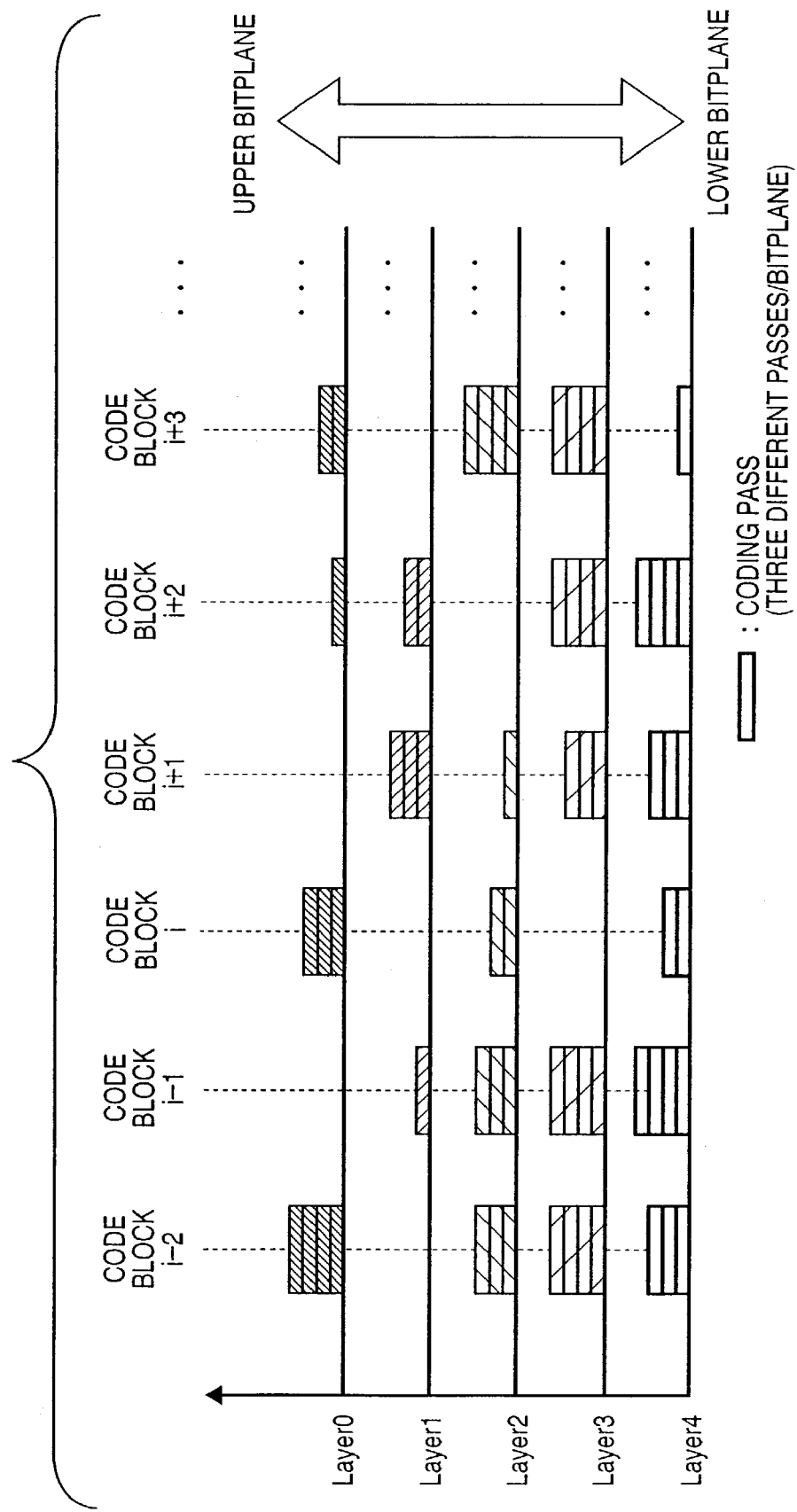

FIG. 36A

| LL01 | LL02 | HL11 | HL12 | HL21 | HL22 |
|------|------|------|------|------|------|
| LL03 | LL04 | HL13 | HL14 | | |
| LH11 | LH12 | HH11 | HH12 | HL23 | HL24 |
| LH13 | LH14 | HH13 | HH14 | | |
| LH21 | | LH22 | | HH21 | HH22 |
| LH23 | | LH24 | | HH23 | HH24 |

FIG. 36B

| PRECINCT NUMBER | LEVEL 0 | LEVEL 1 | | | LEVEL 2 | | |
|---|---|---|---|---|---|---|---|
| 1 | LL01 | HL11 | LH11 | HH11 | HL21 | LH21 | HH21 |
| 2 | LL02 | HL12 | LH12 | HH12 | HL22 | LH22 | HH22 |
| 3 | LL03 | HL13 | LH13 | HH13 | HL23 | LH23 | HH23 |
| 4 | LL04 | HL14 | LH14 | HH14 | HL24 | LH24 | HH24 |

IMAGE PLAYBACK APPARATUS AND METHOD

FIELD OF THE INVENTION

The present invention relates to an image playback apparatus and method and, more particularly, to an image playback apparatus and method, which play back digital moving image data at different rates.

BACKGROUND OF THE INVENTION

Nowadays, moving images are used in various situations. Data of such moving image (moving image data) is recorded as analog or digital data. When the moving image data is analog data, an NTSC monitor is often used to display a playback image. On the other hand, when the moving image data is digital data, its playback image is often displayed on a display which has a plurality of vertical display frequencies like that connected to a PC.

As a moving image playback method, a quick playback method that enables to start playback after a desired image is found is known. As one quick playback method of analog moving image data to be displayed on an NTSC display, a method of winding a magnetic tape which is a recording medium at high speed, and changing regions of the image to be played at given cycles is normally used, as shown in FIG. 27. On the other hand, upon making quick playback and display of digital moving image data, a method of playing back an image while skipping a frame or frames per predetermined number of frames is normally used, as shown in FIG. 28. Furthermore, a quick playback method that divides each frame forming a digital moving image data, synthesizes one frame per a plurality of frames thereby generating a quick playback image, and displays the generated image at high speed as an analog moving image is played back (Japanese Patent Application Laid-Open No. 8-163494).

The aforementioned quick playback of digital moving image data suffers awkward motions of playback images to be displayed. Upon making quick playback of digital moving image data, some users want to use the conventional quick playback display method of analog moving image data, however, to generate data only used for quick playback as disclosed in the Japanese Patent Application Laid-Open No. 8-163494 is a burden to an image playback apparatus.

SUMMARY OF THE INVENTION

The present invention has been made in consideration of the above situation, and has as its object to smoothly display a playback image on a display having a plurality of display frequencies like that of a PC in a quick playback mode of digital moving image data. It is another object of the present invention to allow quick playback/display of digital moving image data, which resembles that of analog moving image data.

According to the present invention, the foregoing object is attained by providing an image playback apparatus of digital moving image data, comprising: a first designation unit for designating playback of an image at a first frame rate; a second designation unit for designating playback of an image at a second frame rate higher than the first frame rate; a selection unit which selects a portion of each frame image represented by the digital moving image data when the playback at the second frame rate is designated; a processing unit which executes a playback process for display of digital moving image data corresponding to the portion selected by the selection unit; and a display processing unit which makes display of the processed digital moving image data by the processing unit on a display capable of operating at a plurality of display frequencies.

According to the present invention, the foregoing object is also attained by providing an image playback apparatus of digital moving image data, comprising: a first designation unit for designating playback of an image at a first frame rate; a second designation unit for designating playback of an image at a second frame rate higher than the first frame rate; a determination unit which determines whether or not each frame image represented by the digital moving image data is to undergo a playback process for display, when the playback at the second frame rate is designated; a selection unit which selects a portion of the frame image, which is determined by the determination unit to undergo the playback process; a processing unit which executes a playback process for display of digital moving image data corresponding to the portion selected by the selection unit; and a display processing unit which makes display of the processed digital moving image data by the processing unit on a display capable of operating at a plurality of display frequencies.

Furthermore, the foregoing object is also attained by providing an image playback apparatus of digital moving image data, comprising: a first designation unit for designating playback of an image at a first frame rate; a second designation unit for designating playback of an image at a second frame rate higher than the first frame rate; a selection unit which selects a portion of encoded data of each frame image represented by the digital moving image data when the playback at the second frame rate is designated; and a processing unit which executes a playback process for display of digital moving image data corresponding to the portion selected by the selection unit.

Further, the foregoing object is also attained by providing an image playback method of digital moving image data, comprising: a designation step of receiving a playback designation of an image at a first frame rate or a second frame rate higher than the first frame rate; a selection step of selecting, when the playback at the second frame rate is designated, a portion of each frame image represented by the digital moving image data; a processing step of executing a playback process for display of digital moving image data corresponding to the portion selected in the selection step; and a display processing step of making display of the digital moving image data processed in the processing step on a display capable of operating at a plurality of display frequencies.

Further, the foregoing object is also attained by providing an image playback method of digital moving image data, comprising: a designation step of receiving a playback designation of an image at a first frame rate or a second frame rate higher than the first frame rate; a determination step of determining, when the playback at the second frame rate is designated, whether or not each frame image represented by the digital moving image data is to undergo a playback process for display; a selection step of selecting a portion of the frame image, which is determined in the determination step to undergo the playback process; and a processing step of executing a playback process for display of digital moving image data corresponding to the portion selected in the selection step; and a display processing step of making display of the digital moving image data processed in the processing step on a display capable of operating at a plurality of display frequencies.

Further, the foregoing object is also attained by providing an image playback method of digital moving image data, comprising: a designation step of receiving a playback destination of an image at a first frame rate or a second frame rate higher than the first frame rate; a selection step of selecting, when the playback at the second frame rate is designated, a portion of encoded data of each frame image represented by the digital moving image data; and a processing step of executing a playback process for display of digital moving image data corresponding to the portion selected in the selection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A and 9B are explanatory views of one-dimensional discrete wavelet transformation;

FIG. 10A shows data which is broken up into four subbands;

FIG. 10B shows an LL subband in FIG. 10A, which is further broken up into four subbands;

FIG. 10C shows an LL subband in FIG. 10B, which is further broken up into four subbands;

FIG. 11 is a table showing quantization steps;

FIGS. 13A and 13B are explanatory views of bit plane segmentation;

FIGS. 14A to 14C are explanatory views of coding passes;

FIG. 15 is an explanatory view of layer generation;

FIGS. 36A and 36B are views for explaining precinct data;

DETAILED DESCRIPTION OF THE PREFERRED EMBODIMENTS

Preferred embodiments of the present invention will be described in detail in accordance with the accompanying drawings.

First Embodiment

Figure 1:
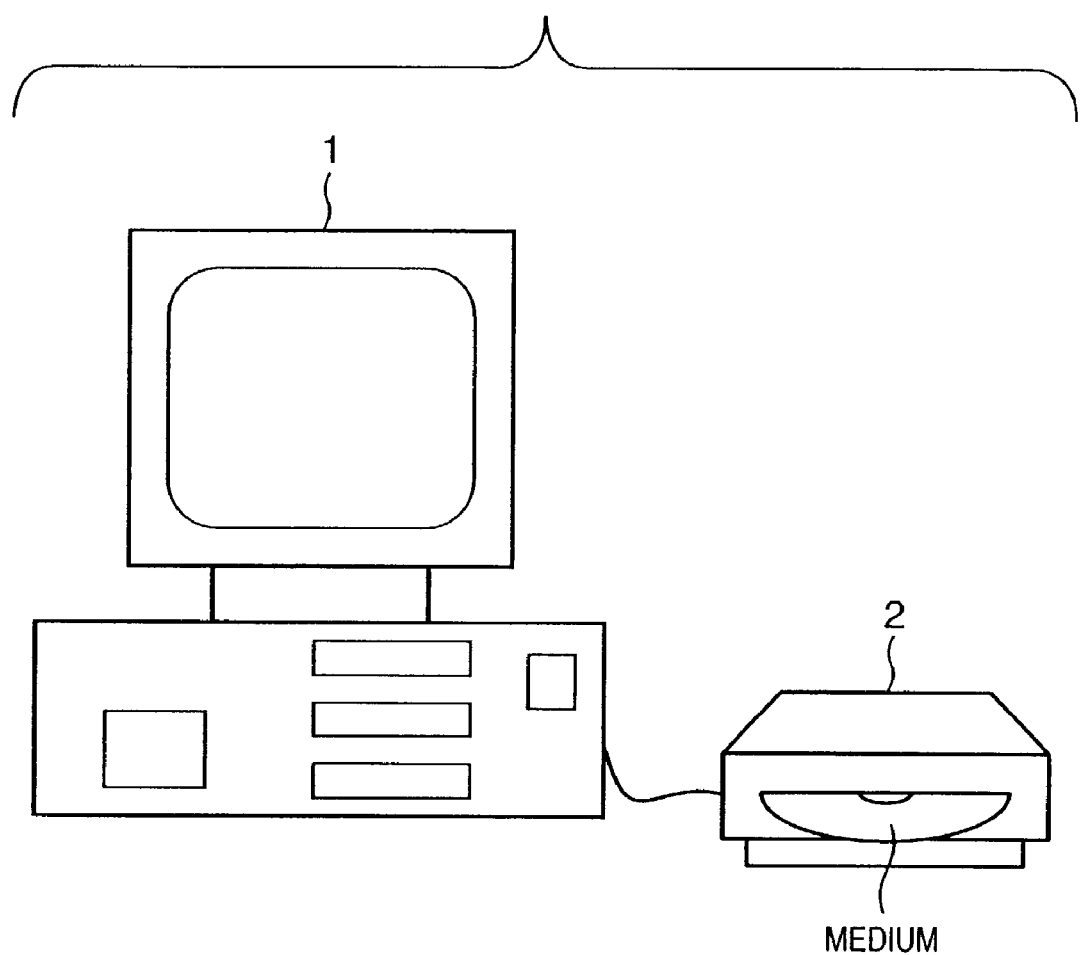
FIG. 1 is a schematic view showing an outer appearance of one aspect of a system that uses a moving image playback apparatus of the present invention.

FIG. 1 is a schematic view showing an example of a playback system that uses a moving image playback apparatus of the present invention. Reference numeral 1 denotes an information processing apparatus such as a personal computer or the like (to be referred to as a "PC" hereinafter); and 2, a drive used to read out data from a storage medium such as a DVD-ROM or the like. In the first embodiment, the PC 1 reads out and decodes encoded moving image data, which is recorded on its internal HDD or a medium such as a DVD-ROM or the like, and displays a playback image on a display. In the first embodiment, assume that the PC 1 has processing performance of decoding all encoded image data having a predetermined size at a maximum of 30 fps (frames/sec). The display is compatible to display frequencies of 30 Hz and 60 Hz. Furthermore, the playback system of the first embodiment makes normal playback at 30 fps.

When double-speed playback is to be made in this playback system, it is impossible to implement double-speed playback by decoding all encoded frame data at 60 fps (30 fps×2) due to the limited processing performance of the PC 1. On the other hand, it is possible to implement double-speed playback by selecting encoded frame data to be decoded while skipping every other frame, and by decoding the selected frame data (i.e., every other frame) at 30 fps. However, with this playback method, a moving image is played back with awkward motions since frames are skipped.

Hence, in this embodiment, in order to allow the PC 1 to display a smooth playback image, data corresponding to a half area of each frame image are decoded in the double-speed playback mode to virtually attain 60 fps upon displaying an image. That playback method will be described below. A moving image encoding apparatus which generates encoded moving image data which can practice the present invention will be explained first, and a moving image playback apparatus that practices the present invention will then be explained. In the following description, since the playback method of audio data falls outside the gist of the present invention, this specification will not touch details of the encoding and playback methods of audio data.

<Moving Image Encoding Apparatus>

Figure 2:
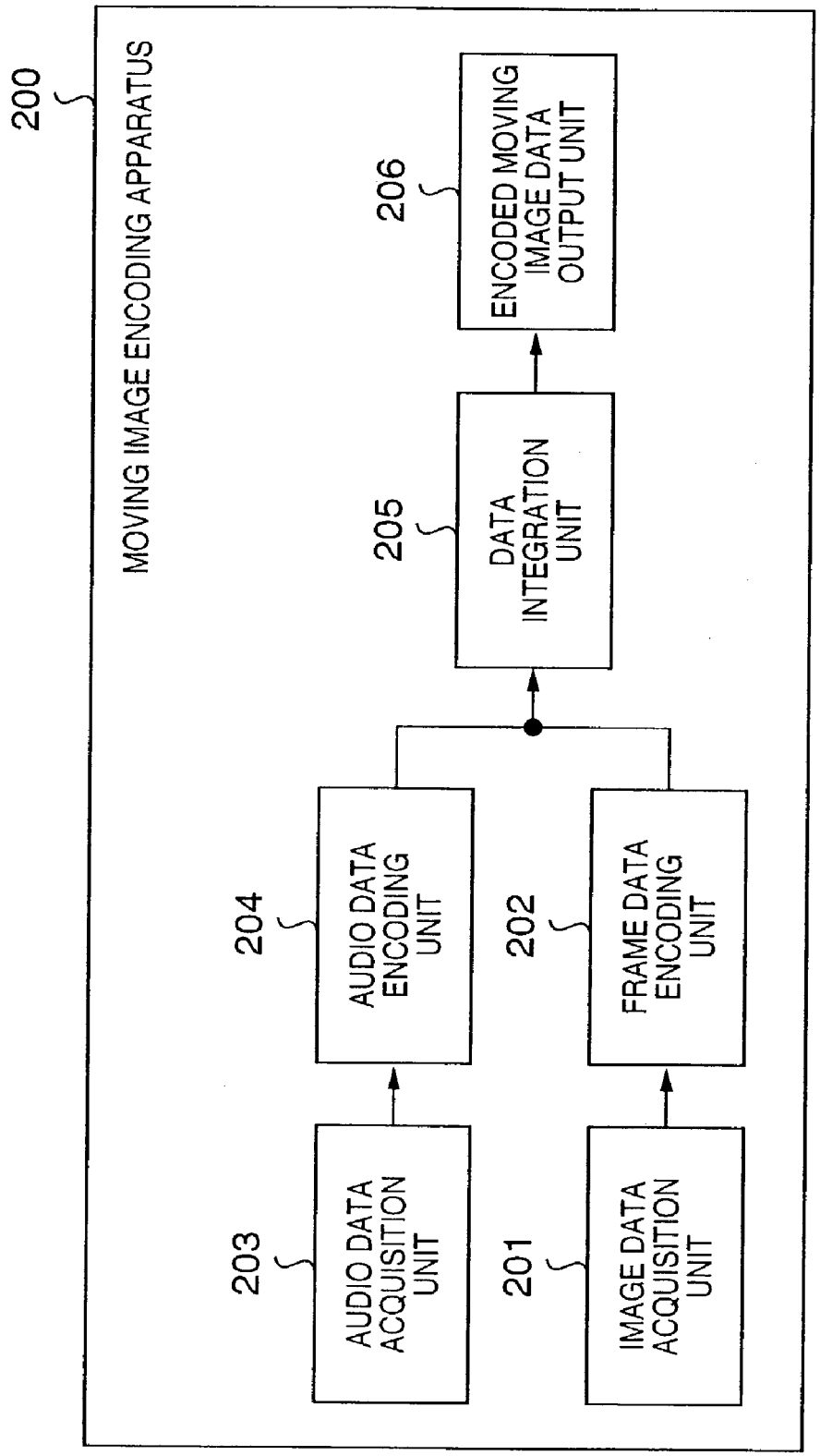
FIG. 2 is a schematic block diagram showing the arrangement of a moving image encoding apparatus according to a first embodiment of the present invention.
Figure 3:
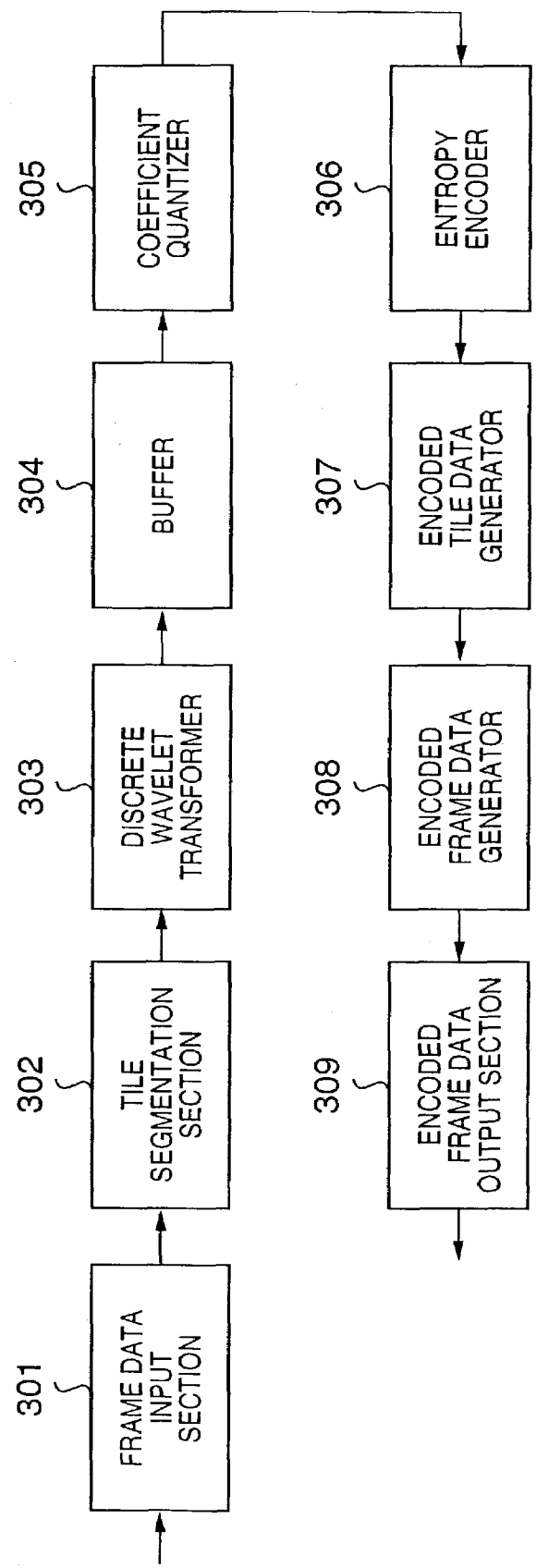
FIG. 3 is a schematic block diagram showing the arrangement of a frame data encoding unit according to the first embodiment of the present invention.
Figure 4:
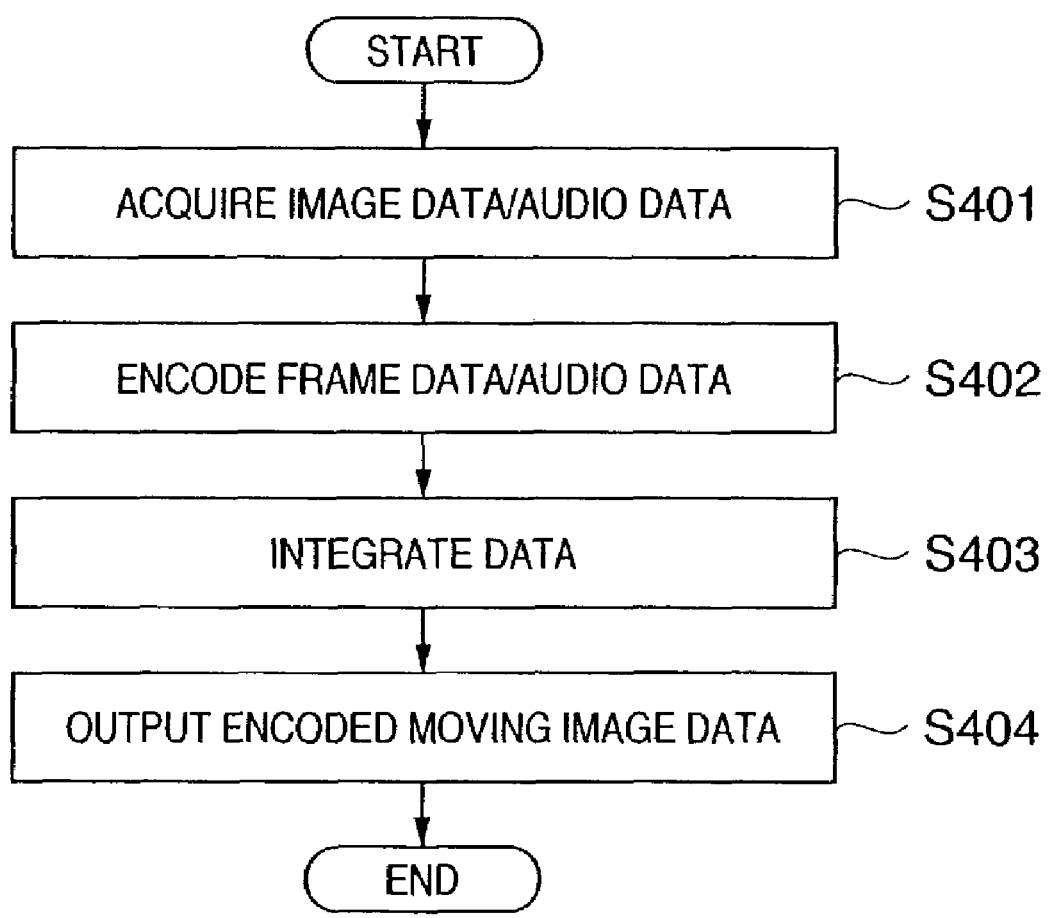
FIG. 4 is a flow chart showing a moving image data encoding process executed by the moving image encoding apparatus according to the first embodiment of the present invention.

FIG. 2 is a block diagram showing the arrangement of a moving image encoding apparatus 200 in the first embodiment, and FIG. 3 shows the arrangement of a frame data encoding unit 202 in FIG. 2. FIG. 4 is a flow chart of the process of the moving image encoding apparatus 200.

Figure 5:
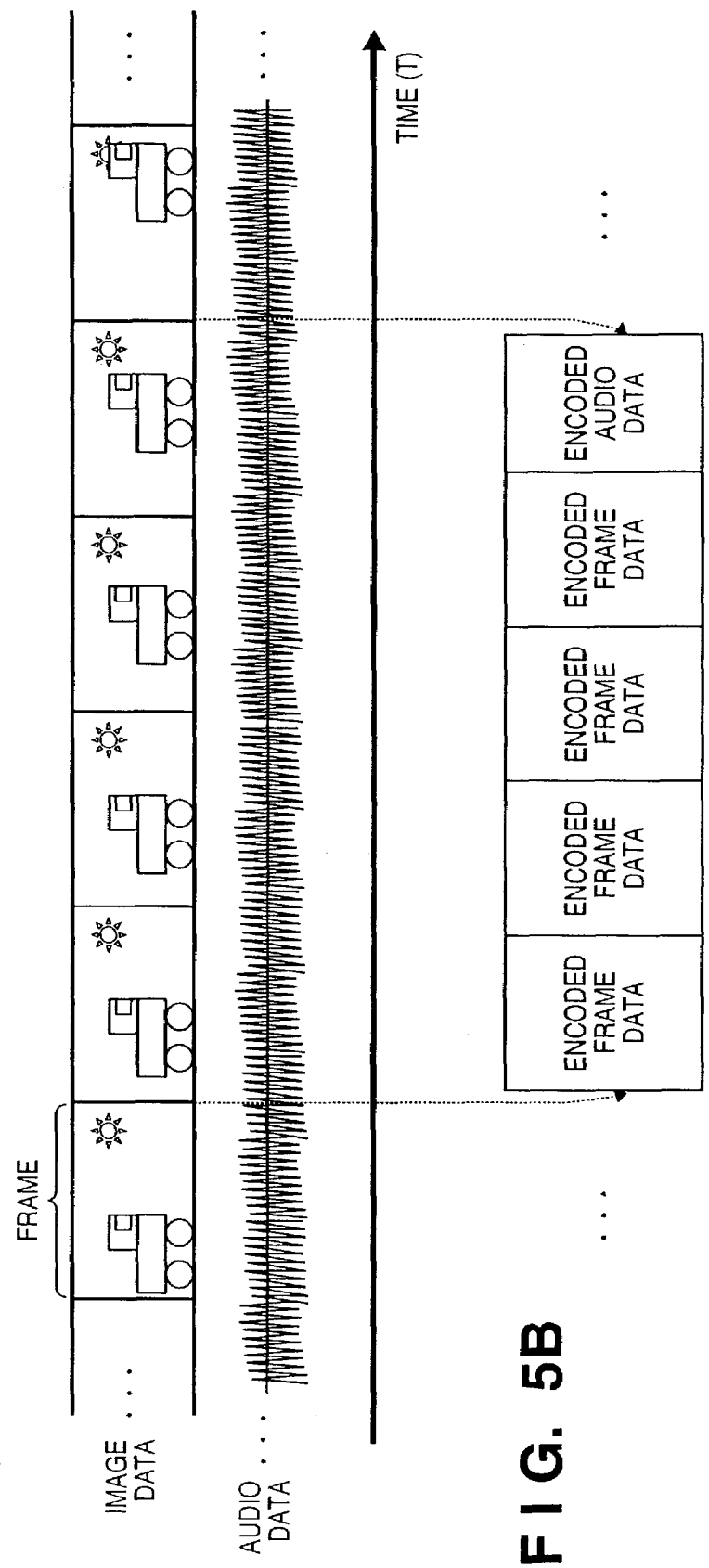
FIGS. 5A and 5B are explanatory views of the format of encoded moving image data.

Image data and audio data are respectively input from an image data acquisition unit 201 and audio data acquisition unit 203 (step S401). The image data acquisition unit 201 and audio data acquisition unit 203 adopt, e.g., an image sensing apparatus such as a digital video camera, digital still camera, scanner, or the like an image sensing device such as a CCD or the like, a network interface, or the like. Furthermore, the image data acquisition unit 201 and audio data acquisition unit 203 may comprise a recording medium such as a RAM, ROM, hard disk, CD-ROM, or the like. FIG. 5A shows the concept of image and audio data obtained by the image data acquisition unit 201 and audio data acquisition unit 203 along with an elapse of time.

In step S402, the image data acquired from the image data acquisition unit 201 is input to a frame data encoding unit 202 for respective frame data (data for respective frames in FIG. 5A). Each frame data input to the frame data encoding unit 202 undergoes a compression process to obtain encoded frame data. A plurality of generated encoded frame data are sequentially input to a data integration unit 205.

On the other hand, the audio data acquired by the audio data acquisition unit 203 is input to an audio data encoding unit 204, and is encoded in the process described below to obtain encoded audio data (step S402).

The generated encoded audio data is input to the data integration unit 205. Note that the following description will not touch details of encoding method of audio data. As the encoding method of audio data, for example, MP3 (MPEG Audio Layer III), AAC (Advance Audio Coding), and the like are available, but the present invention is not limited to these specific methods. Also, audio data need not be encoded.

Figure 6:
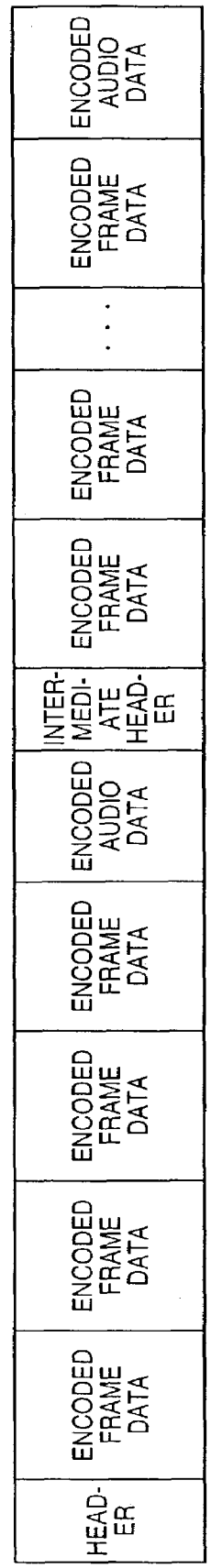
FIG. 6 is an explanatory view of the format of encoded moving image data.

Upon receiving the encoded audio data and encoded frame data, the data integration unit 205 arranges these encoded frame data and encoded audio data on the basis of a predetermined rule, as shown in FIG. 5B. In the example shown in FIG. 5B, after encoded frame data for every four frames, encoded audio data corresponding to these frames is inserted. Furthermore, data such as a header or the like which is required when decoding the frame and audio data is inserted at a predetermined position, as shown in FIG. 6, thus generating encoded moving image data (step S403).

After that, the generated encoded image data is externally output via an encoded moving image data output unit 206 (step S404). As the encoded moving image data output unit 206, an interface of a public telephone line, a wireless line such as Bluetooth or the like, a wired line such as a LAN, USB, IEEE1394, or the like may be used. Further, when the moving image encoding apparatus 200 is arranged inside another apparatus such as the PC 1 or the like, the output unit 206 may be an interface which outputs the data to an internal memory of that apparatus.

Figure 7:
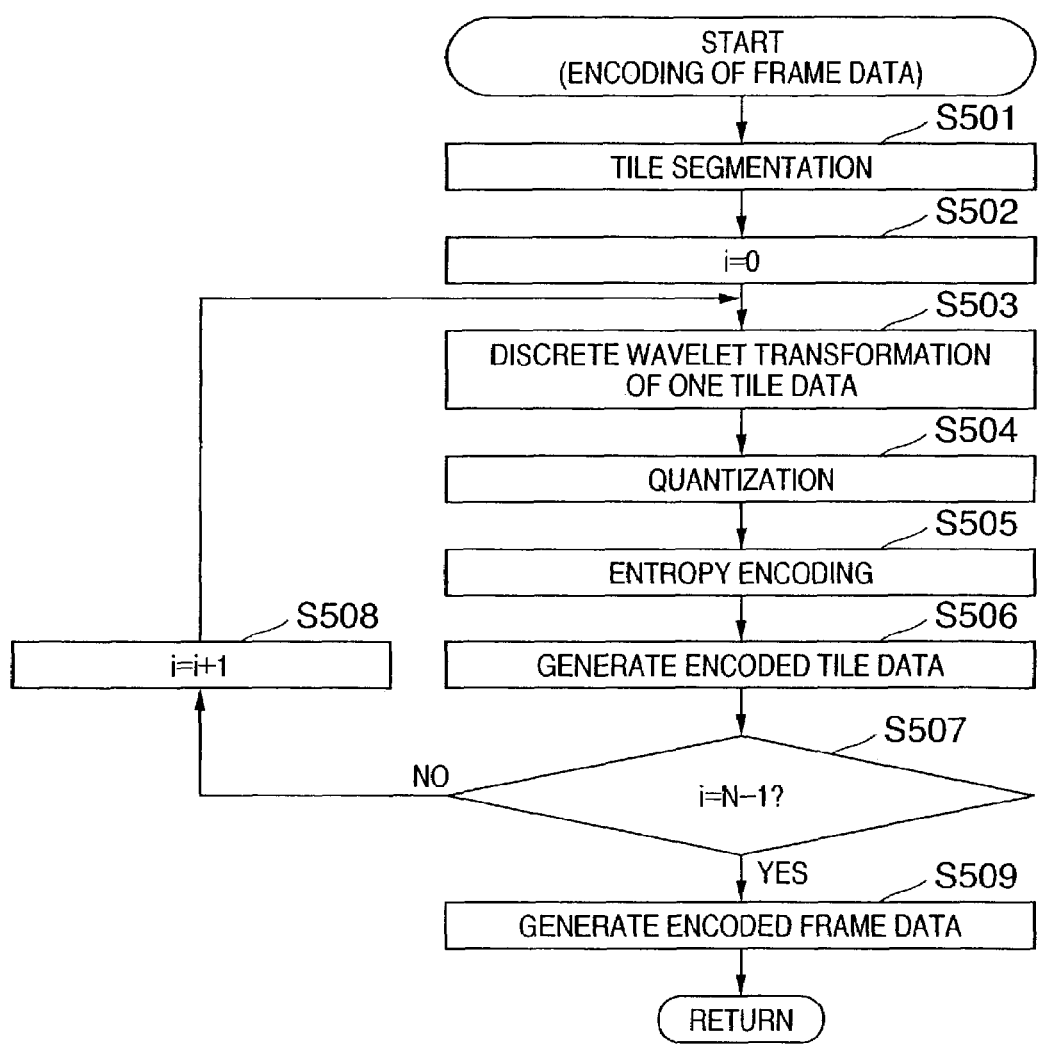
FIG. 7 is a flow chart of a frame data encoding process executed by the frame data encoding unit according to the first embodiment of the present invention.

The frame data encoding process in the frame data encoding unit 202 will be described below with reference to the arrangement of the frame data encoding unit 202 shown in FIG. 3, and the flow chart of FIG. 7.

In the following description, assume that frame data to be encoded is 8-bit monochrome frame data. However, the present invention is not limited to such specific frame data. For example, the present invention can be applied to a monochrome image which is expressed by the number of bits other than 8 bits (e.g., 4 bits, 10 bits, or 12 bits per pixel), or multi-value color frame data which expresses each color component (RGB/Lab/YCrCb) of each pixel by 8 bits. Also, the present invention can be applied to multi-valued information which represents the states and the like of each pixel that forms an image, or a multi-valued index value which represents the color of each pixel. In these applications, each kind of multi-valued information can be considered as monochrome frame data.

Frame data of an image to be encoded are input from the image data acquisition unit 201 to a frame data input section 301 in a raster scan order, and are then output to a tile segmentation section 302.

Figure 8:
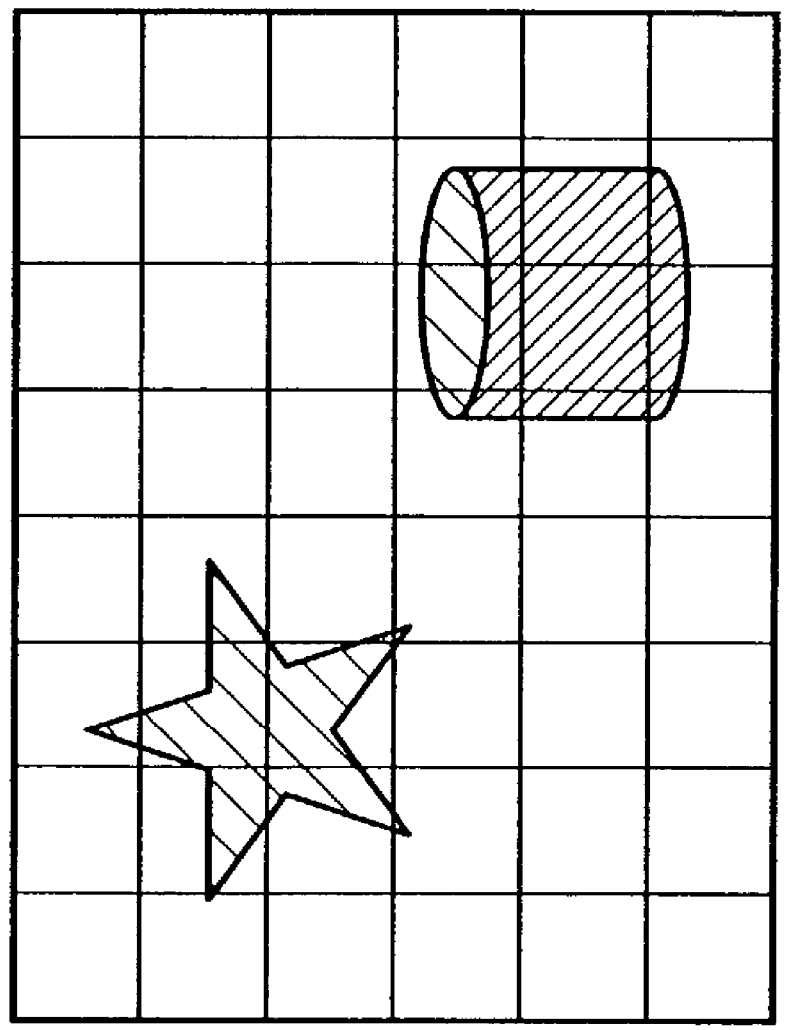
FIG. 8 is an explanatory view of tile segmentation.

The tile segmentation section 302 segments one image input from the frame data input section 301 into N tiles, as shown in FIG. 8 (step S501), and assigns tile numbers 0, 1, 2, . . . , N−1 in a raster scan order in the first embodiment so as to identify respective tiles. Data that represents each tile will be referred to as tile data hereinafter. FIG. 8 shows an example in which an image is broken up into 48 tiles (=8 (horizontal)×6 (vertical)), but the number of segmented tiles can be changed as needed. These generated tile data are sent in turn to a discrete wavelet transformer 303. In the processes of the discrete wavelet transformer 303 and subsequent sections, encoding is done for each tile data.

In step S502, a counter used to recognize a tile to be processed by the frame data encoding unit 202 is set to i=0.

The discrete wavelet transformer 303 computes the discrete wavelet transforms using data of a plurality of pixels (reference pixels) (to be referred to as "reference pixel data" hereinafter) for each tile data in frame data of one frame image, which is input from the tile segmentation section 302 (step S503).

Note that frame data after discrete wavelet transformation (discrete wavelet transformation coefficients) is given by:

$$Y(2n)=X(2n)+\text{floor}\{(Y(2n-1)+Y(2n+1)+2)/4\}$$

$$Y(2n+1)=X(2n+1)-\text{floor}\{(X(2n)+X(2n+2))/2\} \quad (1)$$

where Y(2n) and Y(2n+1) are discrete wavelet transformation coefficient sequences, and more specifically, Y(2n) indicates a low-frequency subband, and Y(2n+1) indicates a high-frequency subband. Further, floor{X} in transformation formulas (1) indicates a maximum integer which does not exceed X. FIGS. 9A and 9B illustrate this discrete wavelet transformation process.

Transformation formulas (1) correspond to one-dimensional data. When two-dimensional transformation is attained by applying this transformation in turn in the horizontal and vertical directions, data can be broken up into four subbands LL, HL, LH, and HH, as shown in FIG. 10A. Note that L indicates a low-frequency subband, and H indicates a high-frequency subband. Then, the LL subband is similarly broken up into four subbands (FIG. 10B), and an LL subband of these subbands is further broken up into four subbands (FIG. 10C). In this way, a total of 10 subbands are generated. The 10 subbands are respectively named HH1, HL1, . . . , as shown in FIG. 10C. A suffix in each subband name indicates the level of a subband. That is, the subbands of level 1 are HL1, HH1, and LH1, those of level 2 are HL2, HH2, and LH2, and those of level 3 are HL3, HH3, and LH3. Note that the LL subband is a subband of level 0. Since there is only one LL subband, no suffix is appended. A decoded image obtained by decoding subbands from level 0 to level n will be referred to as a decoded image of level n hereinafter. The decoded image has higher resolution with increasing level.

The transformation coefficients of the 10 subbands are temporarily stored in a buffer 304, and are output to a coefficient quantizer 305 in the order of LL, HL1, LH1, HH1, HL2, LH2, HH2, HL3, LH3, and HH3, i.e., in turn from a subband of lower level to that of higher level.

The coefficient quantizer 305 quantizes the transformation coefficients of the subbands output from the buffer 304 by quantization steps which are determined for respective frequency components, and outputs quantized values (coefficient quantized values) to an entropy encoder 306 (step S504). Let X be a coefficient value, and q be a quantization step value corresponding to a frequency component to which this coefficient belongs. Then, quantized coefficient value Q(X) is given by:

$$Q(X)=\text{floor}\{(X/q)+0.5\} \quad (2)$$

FIG. 11 shows the correspondence between frequency components and quantization steps in the first embodiment. As shown in FIG. 11, a larger quantization step is given to a subband of higher level. Note that the quantization steps for respective subbands are stored in advance in a memory such as a RAM, ROM, or the like (not shown). After all transformation coefficients in one subband are quantized, these coefficient quantized values are output to the entropy encoder 306.

Figure 12:
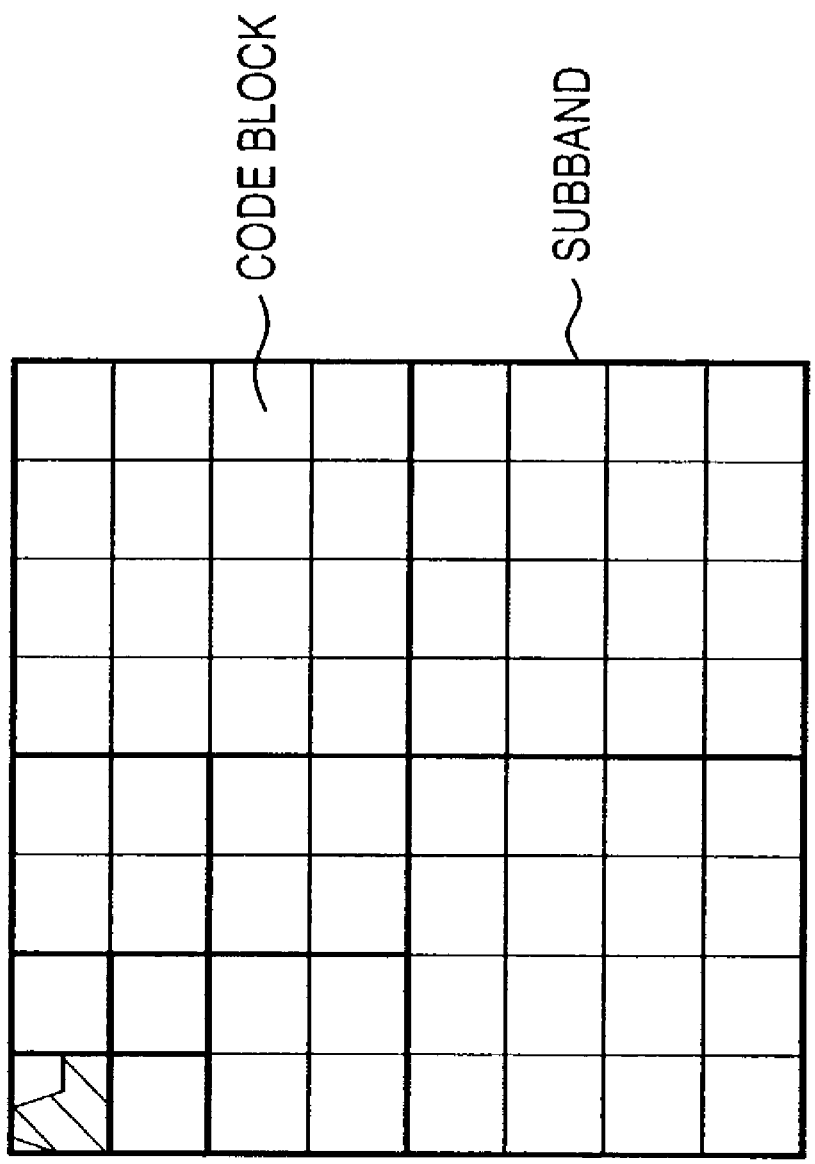
FIG. 12 is an explanatory view of code block segmentation.

The entropy encoder 306 entropy-encodes the input coefficient quantized values (step S505). In this process, each subband as a set of the input coefficient quantized values is segmented into blocks (to be referred to as "code blocks" hereinafter), as shown in FIG. 12. Note that the code block is set to have a size of 2m×2n (m and n are integers equal to or larger than 2) or the like. The code block is further broken up into bitplanes, as shown in FIGS. 13A and 13B. Bits on the respective bitplanes are categorized into three groups on the basis of predetermined categorizing rules to generate three different coding passes as sets of bits of identical types, as shown in FIGS. 14A to 14C. The input coefficient quantized values undergo binary arithmetic encoding as entropy encoding using the obtained coding passes as units, thereby generating entropy encoded values.

Note that entropy encoding of one code block is done in the order from upper to lower bitplanes, and a given bitplane of that code block is encoded in turn from the upper one of the three different passes shown in FIG. 14C.

The entropy-encoded coding passes are output to an encoded tile data generator 307.

The encoded tile data generator 307 forms one or a plurality of layers based on the plurality of input coding passes, and generates encoded tile data using these layers as a data unit (step S506). The format of layers will be described below.

Figure 16A:
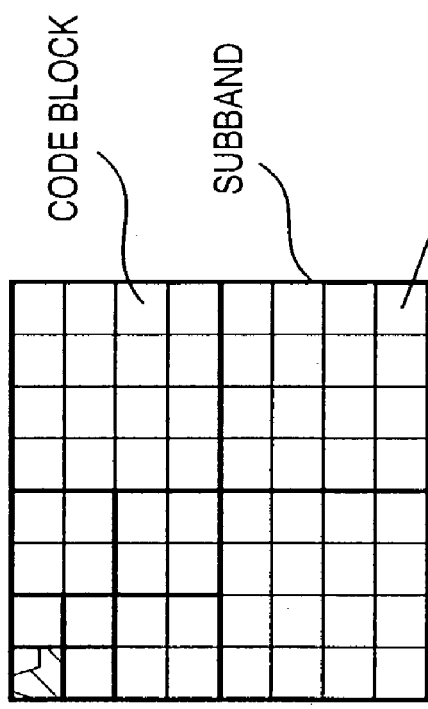
FIGS. 16A and 16B are explanatory views of layer generation.
Figure 16B:
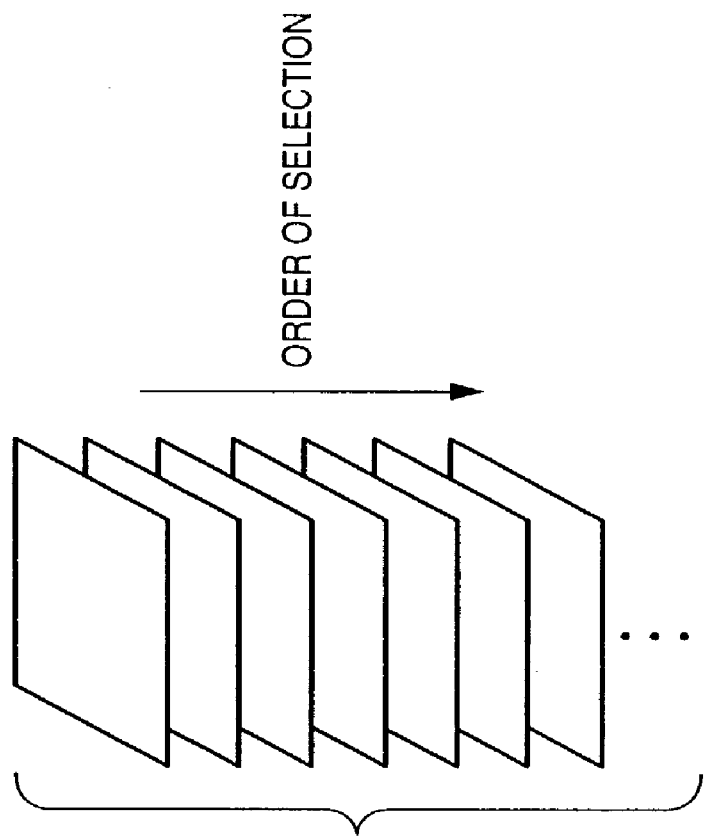
Figure 17:
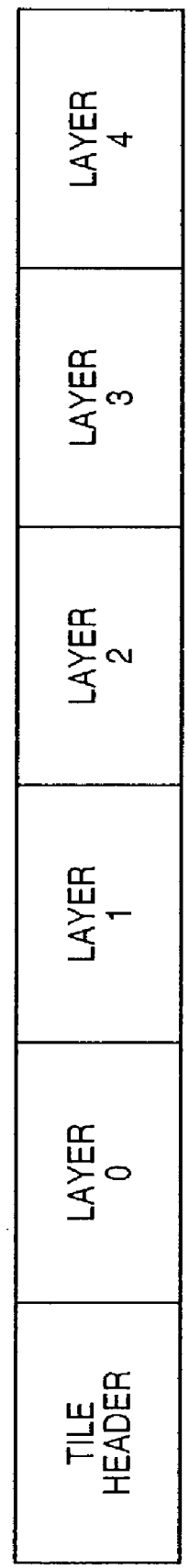
FIG. 17 is an explanatory view of the format of encoded tile data.

The encoded tile data generator 307 forms layers after it collects the entropy-encoded coding passes from the plurality of code blocks in the plurality of subbands, as shown in FIG. 15. FIG. 15 shows a case wherein five layers are to be generated. Upon acquiring coding passes from an arbitrary code block, coding passes are always selected in turn from the uppermost one in that code, as shown in FIGS. 16A and 16B. After that, the encoded tile data generator 307 arranges the generated layers in turn from an upper one, as shown in FIG. 17, appends a tile header to the head of these layers, thus generating encoded tile data. This header stores information used to identify a tile, the code length of the encoded tile data, various parameters used in compression, and the like. The encoded tile data generated in this way is output to an encoded frame data generator 308.

Whether or not tile data to be encoded still remain is determined in step S507 by comparing the value of counter i and the tile number. If tile data to be encoded still remain (i.e., i<N−1), counter i is incremented by 1 in step S508, and the flow returns to step S503 to repeat the processes up to step S507 for the next tile. If no tile data to be encoded remains (i.e., i=N−1), the flow advances to step S509.

Figure 18:
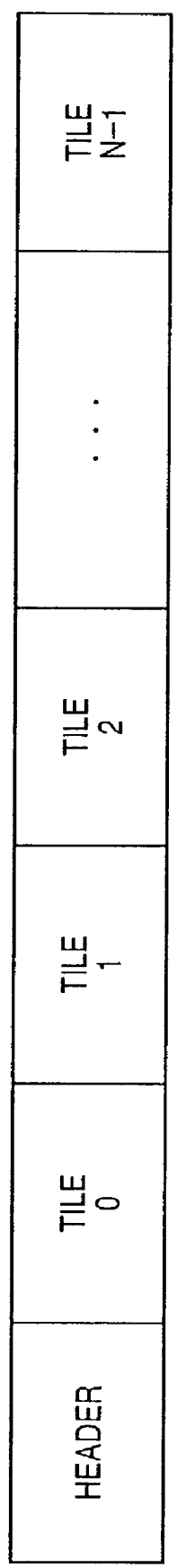
FIG. 18 is an explanatory view of the format of encoded frame data.

The encoded frame data generator 308 arranges the encoded tile data shown in FIG. 17 in a predetermined order (e.g., ascending order of tile number), as shown in FIG. 18, and appends a header to the head of these encoded tile data, thus generating encoded frame data (step S509). This header stores the vertical×horizontal sizes of the input image and each tile, various parameters used in compression, and the like. The encoded frame data generated in this way is output from an encoded frame data output section 309 to the data integration unit 205.

<Moving Image Playback Apparatus>

Figure 19:
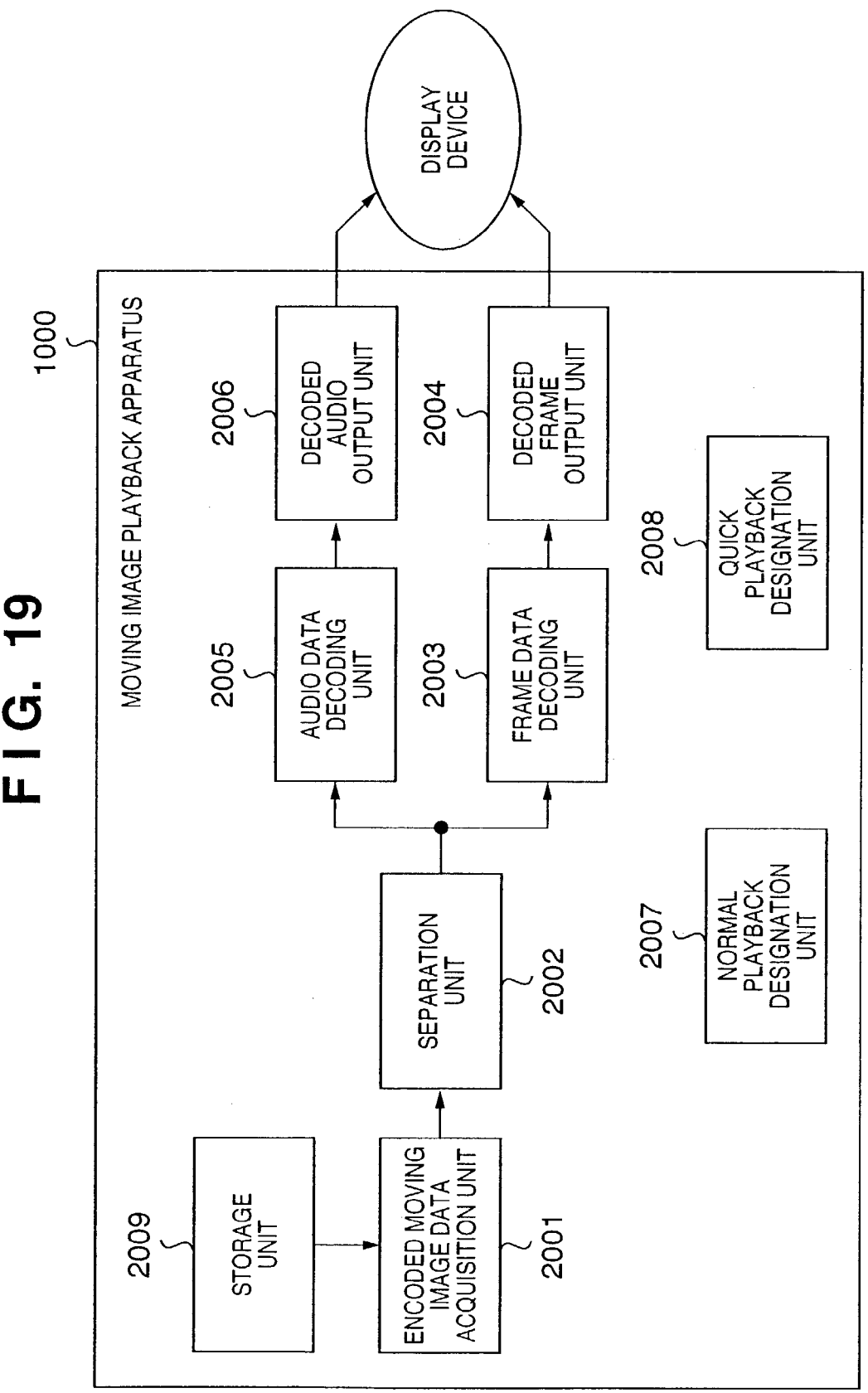
FIG. 19 is a schematic block diagram showing the arrangement of a moving image playback apparatus according to the first embodiment of the present invention.
Figure 20:
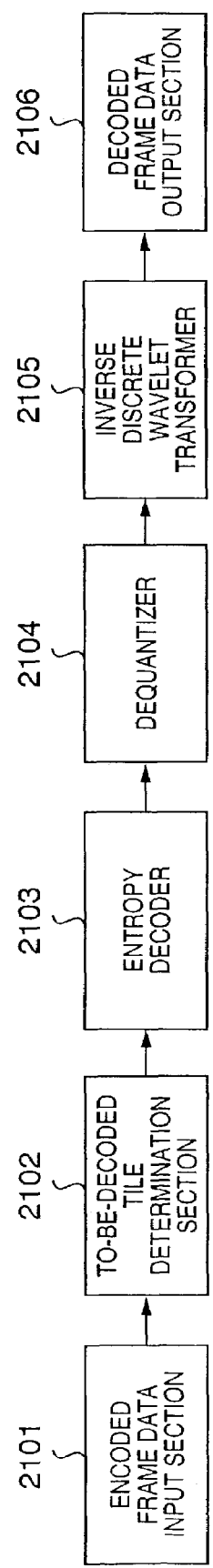
FIG. 20 is a schematic block diagram showing the arrangement of a frame data decoding unit according to the first embodiment of the present invention.
Figure 21:
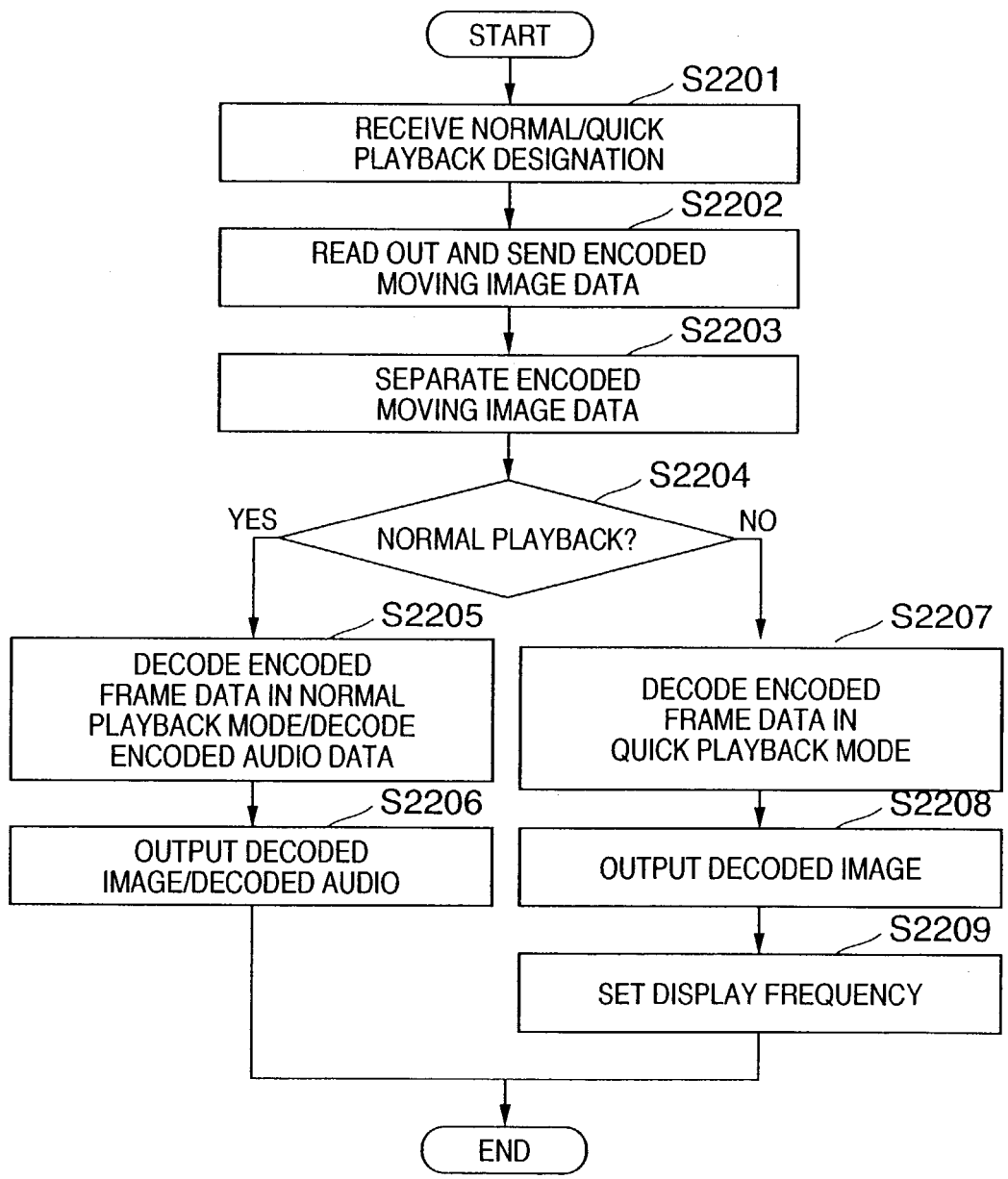
FIG. 21 is a flow chart of a moving image data decoding process executed by the moving image playback apparatus according to the first embodiment of the present invention.

FIG. 19 is a block diagram showing the arrangement of a moving image playback apparatus 1000 of this embodiment, and FIG. 20 shows the arrangement of a frame data decoding unit 2003 in FIG. 19. FIG. 21 is a flow chart of the process of this moving image playback apparatus 1000.

When the moving image playback apparatus 1000 receives a normal or quick playback designation from the user via a normal playback designation unit 2007 or quick playback designation unit 2008 (step S2201), an encoded moving image data acquisition unit 2001 reads out encoded moving image data from a storage unit 2009, and sends it to a separation unit 2002 (step S2202).

Upon receiving the encoded moving image data, the separation unit 2002 separates that encoded moving image data into encoded frame data and encoded audio data (step S2203). The generated encoded frame data are output to a frame data decoding unit 2003, and the encoded audio data are output to an audio data decoding unit 2005. The frame data decoding unit 2003 receives information of a playback method (normal/quick playback) designated by the user together with the encoded frame data. Note that the playback method of audio data falls outside the gist of the present invention, and a description of encoded audio data will be omitted.

At the beginning of a decoding process of the separated encoded frame data, the playback method designated by the user is checked (step S2204). If the user designates normal playback, the frame data decoding unit 2003 decodes the encoded frame data in a normal playback mode to generate decoded frame data (step S2205). Also, the audio data decoding unit 2005 decodes the encoded audio data to generate decoded audio data (step S2205).

On the other hand, if the user designates a playback method other than normal playback (i.e., designates quick playback), the frame data decoding unit 2003 decodes the encoded frame data in a quick playback mode to generate decoded frame data (step S2207). Note that encoded audio data is not decoded in the quick playback mode. The playback speed at this time is determined in accordance with an arbitrary speed designated by a user or the display frequency of a display.

The decoded frame data and audio data generated in step S2205, and the decoded frame data generated in step S2207 are output from a decoded frame output unit 2004 and decoded audio output unit 2006 to a display device (step S2206 or S2208). If the frame rate of the decoded frame data does not match the display frequency of the display, the display frequency is set to the optimal frequency at which the output frame data can be displayed (S2209).

The process executed by the frame data decoding unit 2003 in FIG. 19 will be described below with reference to FIG. 20 that shows the detailed arrangement of the frame data decoding unit 2003, and the flow chart of FIG. 22.

Figure 23B:
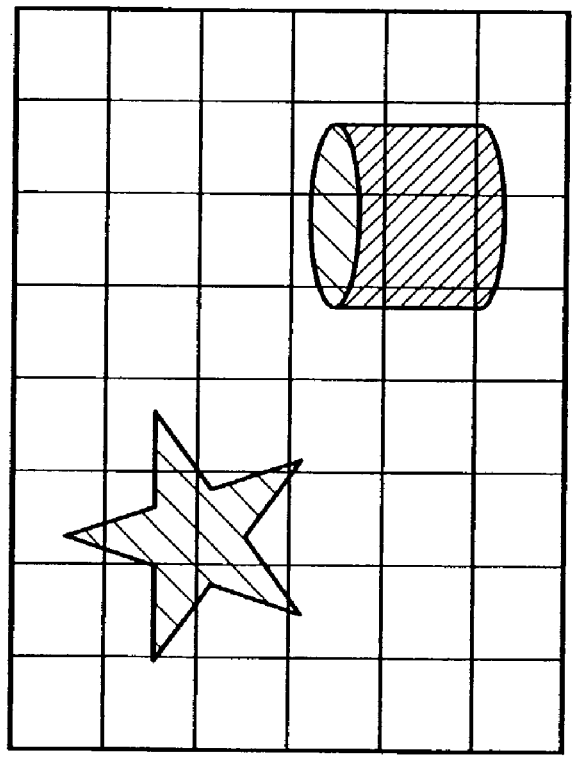
FIGS. 23A and 23B are explanatory views that pertain to determination of encoded tile data to be decoded according to the first embodiment of the present invention.
Figure 23A:
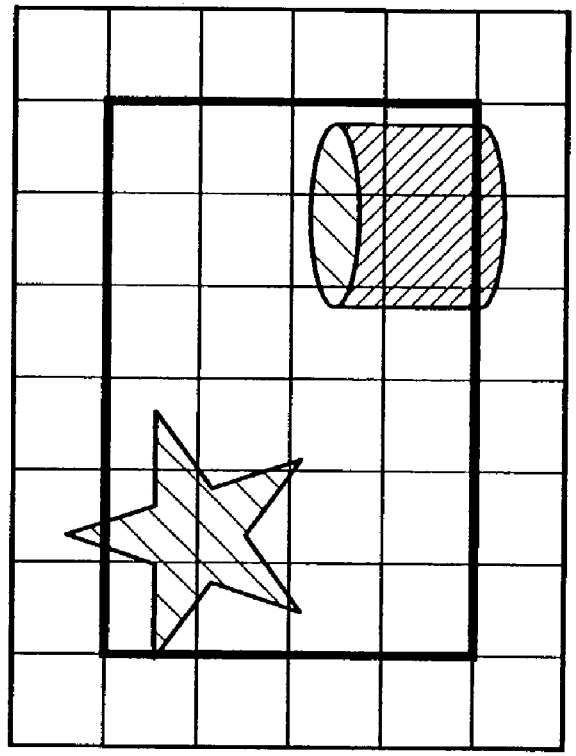

The encoded frame data and playback method information input to an encoded frame data input section 2101 are output to a to-be-decoded tile determination section 2102. If the playback method is normal playback, the to-be-decoded tile determination section 2102 determines all tiles in a frame shown in FIG. 23A as tiles to be decoded (step S2501). On the other hand, if the playback method is quick playback, the section 2102 determines a part of tiles in a frame as tiles to be decoded (step S2501), as indicated by the bold line in FIG. 23B. Upon determining tiles to be decoded, information stored in the main header and tile header is used. In FIG. 23B in the quick playback mode, inner 24 tiles (=4 (vertical)×6 (horizontal)) of a total of 48 tiles (=6 (vertical)×8 (horizontal)) are determined as tiles to be decoded. However, the present invention is not limited to this, and an arbitrary number of tiles that can be processed need only be selected in accordance with the processor speed.

Figure 24:
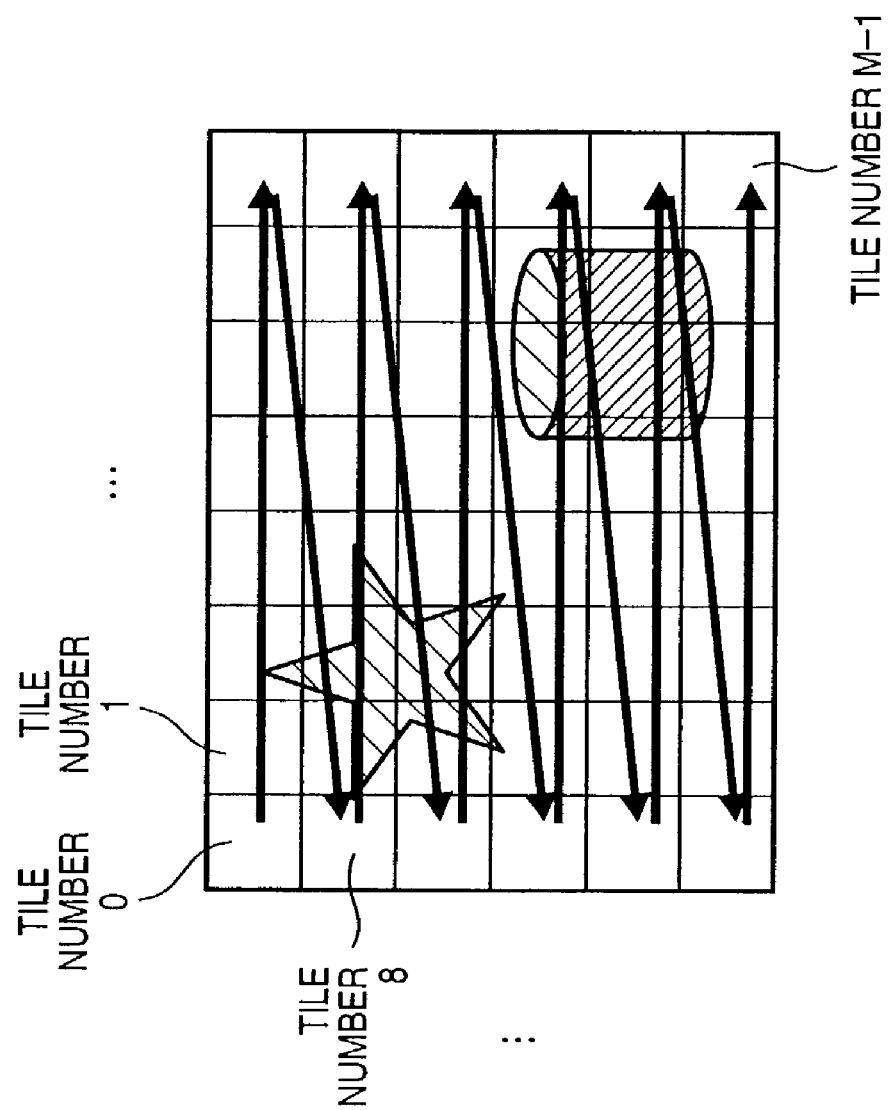
FIG. 24 is an explanatory view of assignment of identification numbers associated with encoded tile data.

Let M be the number of tiles to be decoded, which are determined in this process. Numbers 0 to M−1 are assigned to the tiles to be decoded so as to identify respective tiles to be decoded. In this case, the numbers are assigned so that the number increments from the upper left tile toward right neighboring tiles, and also from the uppermost tile toward lower tiles, as shown in FIG. 24.

After the tiles to be decoded are determined, a counter used to recognize a tile to be processed by the frame data decoding unit 2003 is set to i=0 (step S2502).

The encoded tile data to be decoded is input to an entropy decoder 2103 and undergoes entropy decoding, thus reproducing quantized values (step S2503). The reproduced quantized values are output to a dequantizer 2104. The dequantizer 2104 dequantizes the input quantized values to reproduce discrete wavelet transformation coefficients, and outputs them to an inverse discrete wavelet transformer 2105 (step S2504). Dequantization is done by:

$$Xr = Q \times q$$

where Q is the quantized value, q is the quantization step, and Xr is a reproduced discrete wavelet transformation coefficient. The inverse discrete wavelet transformer 2105 computes the inverse discrete wavelet transforms (step S2505) by:

$$X(2n) = Y(2n) - \text{floor}\{(Y(2n-1) + Y(2n+1) + 2)/4\}$$

$$X(2n+1) = Y(2n+1) + \text{floor}\{(X(2n) + X(2n+2))/2\}$$

where $Y(2n)$ is a discrete wavelet transformation coefficient of a lower-frequency subband, and $Y(2n+1)$ is that of a higher-frequency subband. Also, $X(n)$ is decoded data. These transformation formulas are used for one-dimensional data. By applying this transformation in turn in the horizontal and vertical directions, two-dimensional transformation is implemented. Then, decoded tile data is generated and is output to a decoded frame data output section 2106 (step S2506).

Whether or not tiles to be decoded still remain is determined in step S2507 by comparing counter i and the tile number. If tile/tiles to be decoded still remain (i.e., i<M−1), counter i is incremented by 1 in step S2508, and the flow returns to step S2503 to repeat the processes up to step S2507 for the next tile. On the other hand, if no tile to be decoded remains in step S2507 (i.e., i=M−1), the flow advances to step S2509.

The decoded frame data output section 2106 generates decoded frame data by arranging the decoded tile data in the order of i=0, . . . , M−1, and outputs that data to the decoded frame output unit 2004 (step S2508).

In the first embodiment, the decoded frame data are output to the external display to have different display frequencies in correspondence with normal playback (30 fps) and double-speed playback (60 fps). In this case, the display switches the display frequency in accordance with that of output frame data so as to display the frame data.

As described above, according to the first embodiment, since a part of blocks of each frame are played back in the quick playback mode, a smooth playback image can be displayed within the processing performance of the PC.

In the first embodiment, blocks half of those of each frame are played back in the quick playback mode, thereby playing back an image at a speed twice that in the normal playback mode. However, the present invention is not limited to such specific method. For example, when blocks 1/3 or 1/4 of those of each frame are played, back, an image can be smoothly played back at a triple or quadruple speed. In this manner, by playing back an image corresponding to blocks at an arbitrary ratio, playback can be made at a desired multiple speed.

Second Embodiment

The second embodiment of the present invention will be described below.

The first embodiment has explained the method of smoothly displaying a playback image within the processing performance of the PC by playing back a part of blocks of each frame.

However, the method of the first embodiment cannot always realize quick playback at a desired multiple speed depending on compatible vertical display frequencies of a display. For example, in order to realize triple-speed playback by the method of the first embodiment, the vertical display frequency of the display must be 90 Hz. If the display is compatible to display frequencies of 30, 60, and 75 Hz, the triple-speed playback cannot be realized by the above method.

However, it is possible to realize the triple-speed playback by selecting a part of blocks of each frame as those to be decoded, decoding the selected blocks while skipping one frame per six frames, and displaying the decoded frames at 75 Hz. This playback method can display a smooth moving image compared to a method that plays back every third frames at a vertical display frequency of 30 Hz.

In this way, the second embodiment of the present invention realizes quick playback by combining a vertical display frequency higher than that used in the normal playback mode, and a decoding method (skip decoding) that decodes while skipping frames. In the second embodiment, assume that a decoded image is displayed on a display which is compatible to display frequencies of 30, 60, and 75 Hz. Note that encoded moving image data that allows such display can use the data generated by the moving image encoding apparatus of the first embodiment. Therefore, in the second embodiment, a description of the arrangement and processing operation of the moving image encoding apparatus will be omitted.

<Moving Image Playback Apparatus>

The arrangement of a moving image playback apparatus in the second embodiment is the same as that shown in FIG. 19, but the operations of the separation unit 2002 and frame data decoding unit 2003 are different from those in the first embodiment. The operation of the moving image playback apparatus in the second embodiment will be described below with reference to the flow chart in FIG. 25. Note that the same step numbers in FIG. 25 denote the same processes as those in FIG. 21, and a detailed description thereof will be omitted.

Upon reception of the encoded moving image data from the encoded moving image data acquisition unit 2001 in step S2202, the separation unit 2002 checks in step S2600 if quick playback is designated. If quick playback is designated, information on the display frequency currently set in the display for displaying the playback image and the compatible display frequency of the display (referred to as display frequency information) is received (step S2601), then the flow advances to step S2602, and the separation unit 2002 checks if the received encoded moving image data corresponds to data of a frame to be skipped. For example, if a display which makes a display at 30 fps in the normal playback mode can make a display at 75 fps, (5/2)×speed (5/2=75/30) playback is realized. In this case, in order to realize triple-speed playback, one encoded frame data is skipped per six frames, and encoded moving image data of the frame to be skipped is not sent to the frame data decoding unit 2003 and audio data decoding unit 2005. Hence, if it is determined in step S2602 that the received data is the frame to be skipped, no more processes for that encoded moving image data are done, and the process ends.

On the other hand, if quick playback is not designated (NO in step S2601) and if the received data is not a frame to be skipped (NO in step S2602) even when quick playback is designated, the flow advances to step S2203, and the separation unit 2002 separates the encoded moving image data into encoded frame data and encoded audio data.

Figure 22:
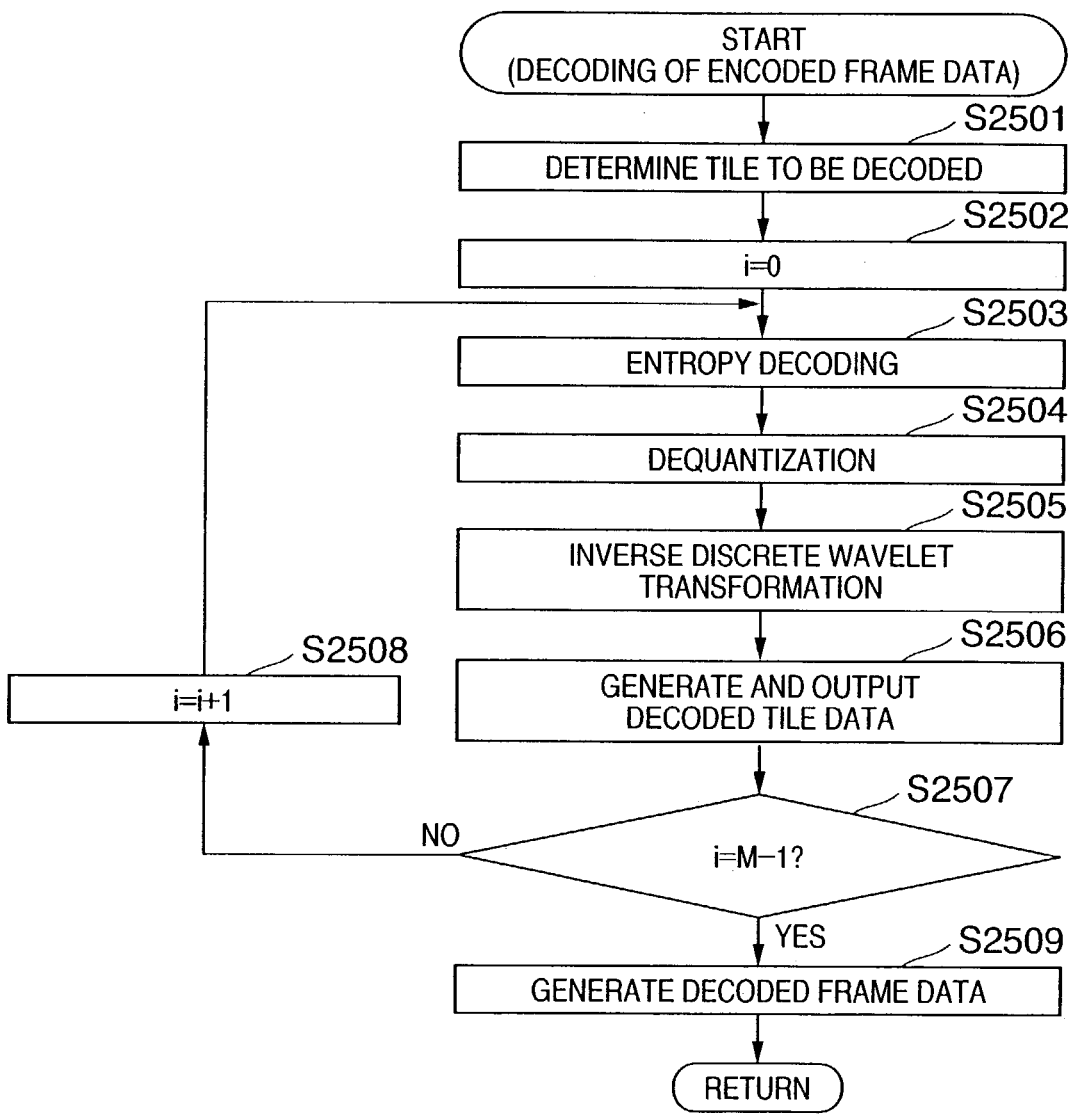
FIG. 22 is a flow chart showing a frame data decoding process in a quick playback mode according to the first embodiment of the present invention.

In step S2207, basically the same process as that shown in FIG. 22 is executed. In the second embodiment, however, tiles to be decoded, which are determined in step S2501, are different from those shown in FIG. 23B.

Figure 26:
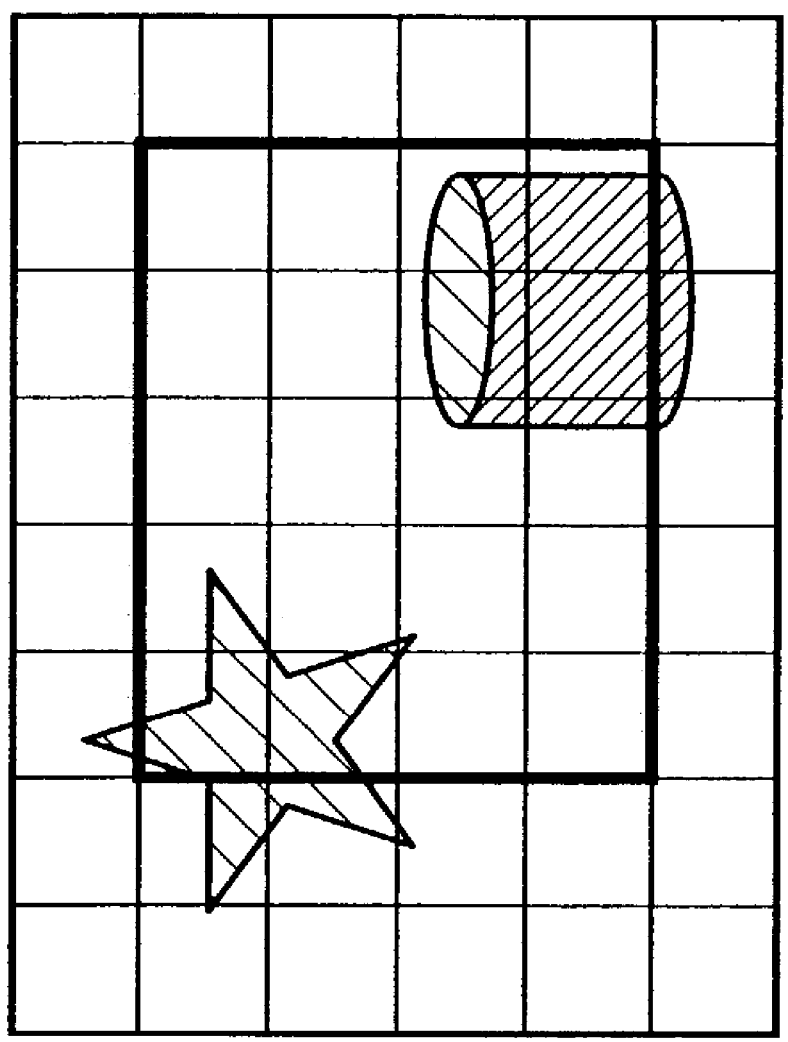
FIG. 26 is an explanatory view that pertains to determination of encoded tile data to be decoded according to the second embodiment of the present invention.
Figure 27:
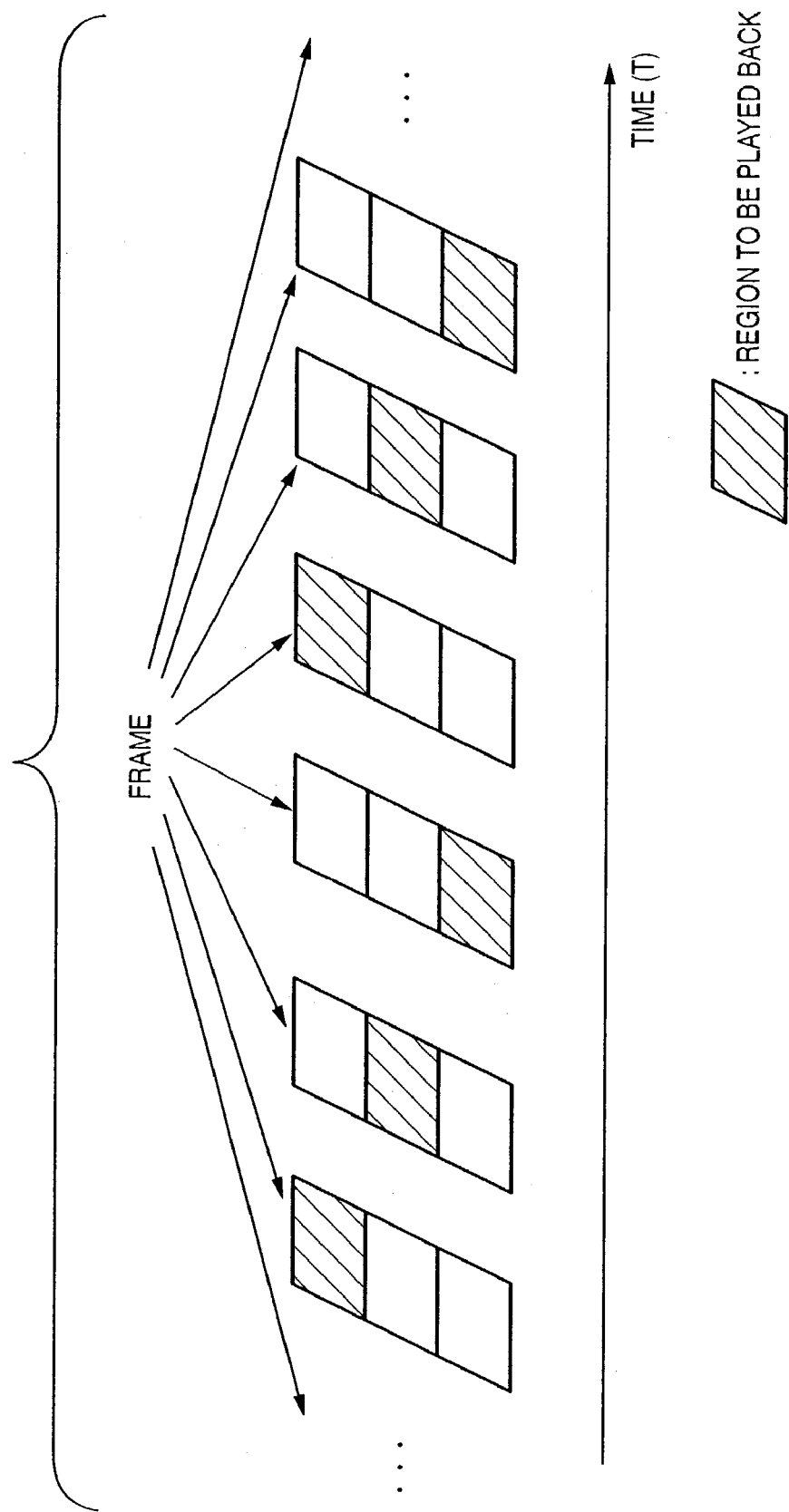
FIG. 27 is an explanatory view showing an example of a conventional quick playback method of analog moving image data.
Figure 28:
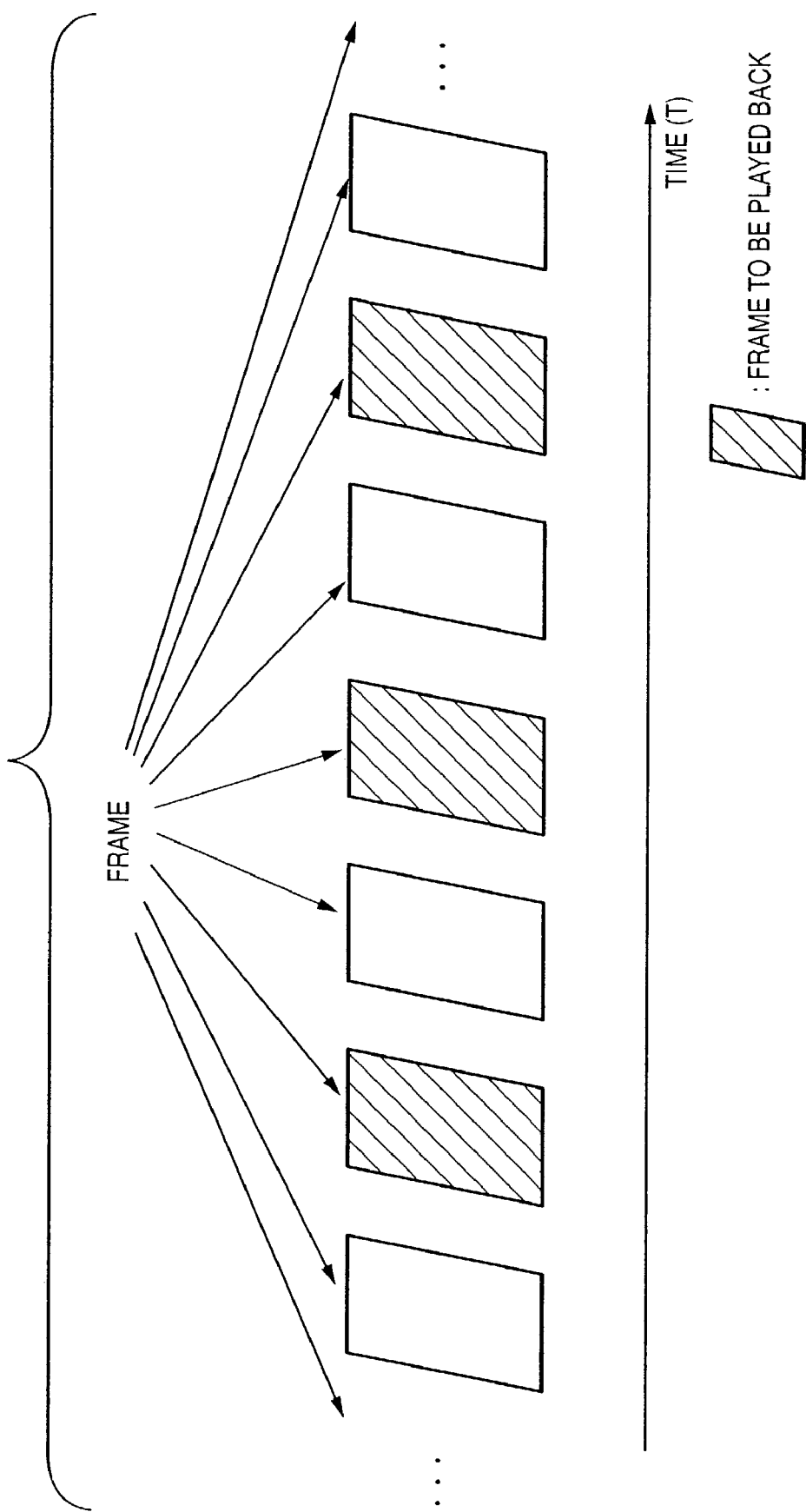
FIG. 28 is an explanatory view showing an example of a conventional quick playback method of digital moving image data.

In the second embodiment, the to-be-decoded tile determination section 2102 in the frame data decoding unit 2003 determines tiles to be decoded so as to allow the PC, whose limit is placed at normal playback at 30 fps, to decode at 75 fps. In order to implement such decoding, decoding must be done at a speed 5/2 (=75/30) times higher than normal playback. Hence, in the second embodiment, 20 tiles (≈48 (total number of tiles)×2/5) are determined as those to be decoded, as shown in FIG. 26. Note that the positions of the 20 tiles are not limited to those shown in FIG. 26, and may be changed as needed.

After the tiles to be decoded are determined in this way, the processes in step S2502 and the subsequent steps are the same as those in the first embodiment.

In this embodiment, decoded frame data are output to the external display to have display frequencies corresponding to the playback speeds in the quick playback mode. In this case, the display switches the display frequency in accordance with that of the output frame data (step S2209 in FIG. 25). Since the displayable frequencies of the display are known in advance, no display error occurs.

Note that the second embodiment has explained the case wherein the display is compatible to the display frequencies of 30, 60, and 75 Hz. However, the present invention is not limited to such specific frequencies. By changing the ratio of data blocks to be decoded in each frame and the ratio of frames to be skipped, the playback speed can be adjusted as needed in correspondence with the performance of the display and PC.

As described above, according to the second embodiment, since the method of decoding a part of blocks of each frame is combined with the method of skipping a frame per predetermined number of frames to implement quick playback, quick playback can be made at an optimal multiple speed.

Third Embodiment

The third embodiment of the present invention will be described below.

In general, when encoded image data obtained by an encoding method using tiles as units is decoded, the obtained decoded image suffers block distortion. This distortion seriously deteriorates the quality of the playback image. In a decoded image of encoded image data which is generated at a low bit rate, the level of such noise is conspicuous. Therefore, it is very important to compress an image without causing any block distortion. Hence, the third embodiment will explain an encoding method which does not execute tile segmentation upon encoding so as to make a playback image free from any block distortion, and a method of smoothly playing back encoded moving image data obtained by such method in a quick playback mode.

A playback system in the third embodiment is basically the same as that in the first embodiment explained with reference to FIG. 1. That is, assume that the PC 1 has processing performance of decoding all encoded image data having a predetermined size at a maximum of 30 fps (frames/sec), and a display is compatible to display frequencies of 30 Hz and 60 Hz. Furthermore, the playback system of the third embodiment makes normal playback at 30 fps.

In order to allow the PC 1 to display a smooth playback image, data corresponding to a half area of each frame image are decoded in a double-speed playback mode to substantially attain a display at 60 fps.

A moving image encoding apparatus of the third embodiment will be explained first.

<Moving Image Encoding Apparatus>

The moving image encoding apparatus of the third embodiment is basically the same as that of the first embodiment, which has been explained with reference to FIGS. 2 to 18, but does not make any tile segmentation unlike in the first embodiment. A process as a characteristic feature of the third embodiment will be explained below.

In the third embodiment, the tile segmentation section 302 executes its process with the number N of tiles=1. Therefore, the tile segmentation section 302 does not segment each frame image input from the frame data input section 301 unlike in FIG. 8, and the processes of the discrete wavelet transformer 303 and subsequent sections are done for respective frame images. Hence, encoded frame data shown in FIG. 18 obtained by encoding has the number of tiles=1 (i.e., only tile 0).

The moving image playback apparatus of the first embodiment decodes tiles corresponding a half area of each frame image in the quick playback mode. However, since no tile segmentation is made in the third embodiment, the moving image playback apparatus decodes code blocks of each subband corresponding to a half area of each frame image. For this purpose, the moving image encoding apparatus of the third embodiment embeds information required to access respective code blocks in the encoded moving image data of each frame. As one information embedding method, a method of describing the positions of code blocks (offsets from the head of encoded image data) in a main header is available (method 1). As another method, a method of providing the following data format to encoded image data, and embedding information in correspondence with that data format is available (method 2).

Data Format

The moving image encoding apparatus of the third embodiment forms packets by collecting data of code blocks which belong to an identical resolution level and layer, and appends a packet header to the head of each packet. Furthermore, the moving image encoding apparatus arranges packets in a predetermined order, and inserts a main header immediately before the first packet.

Embedding of Information

In each packet header, the code lengths of code blocks in the corresponding packet are written. Furthermore, data corresponding to the order of packets, the number of resolution levels, the number of layers, the number of code blocks included in each packet, and the like are written in the main header.

Figure 29A:
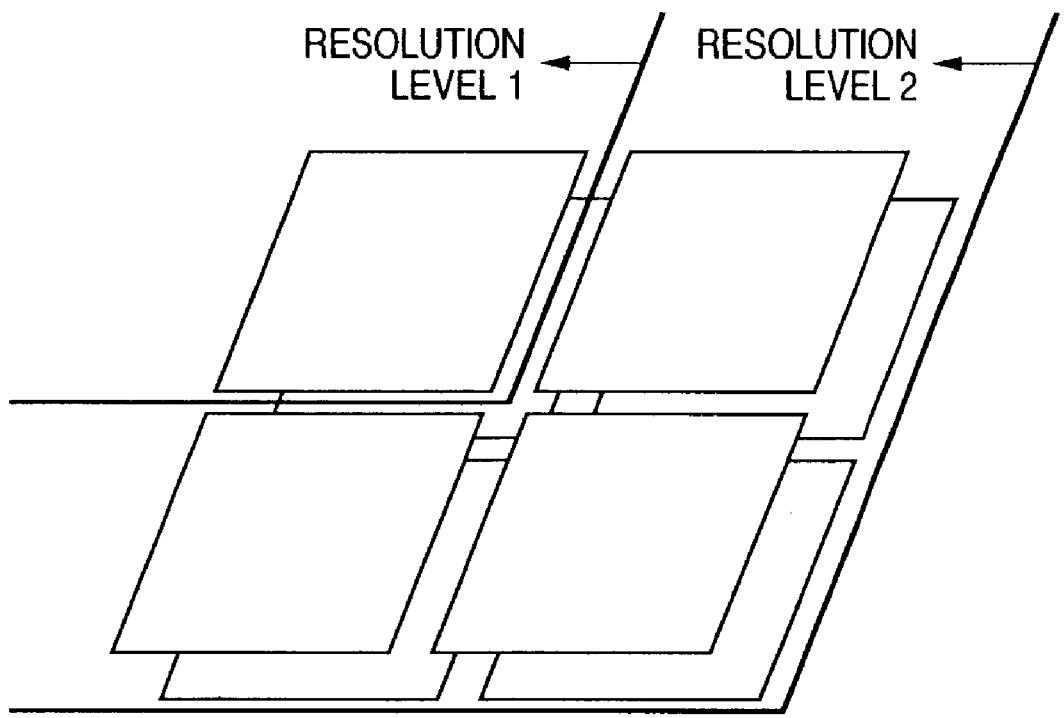
FIGS. 29A and 29B are schematic views of an encoding method according to a third embodiment of the present invention.
Figure 29B:
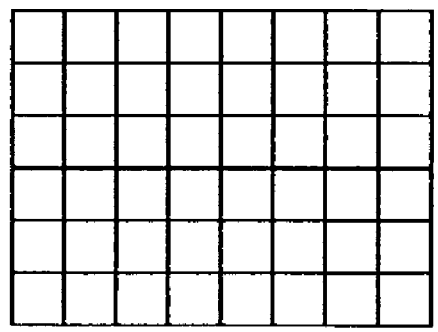
Figure 30:
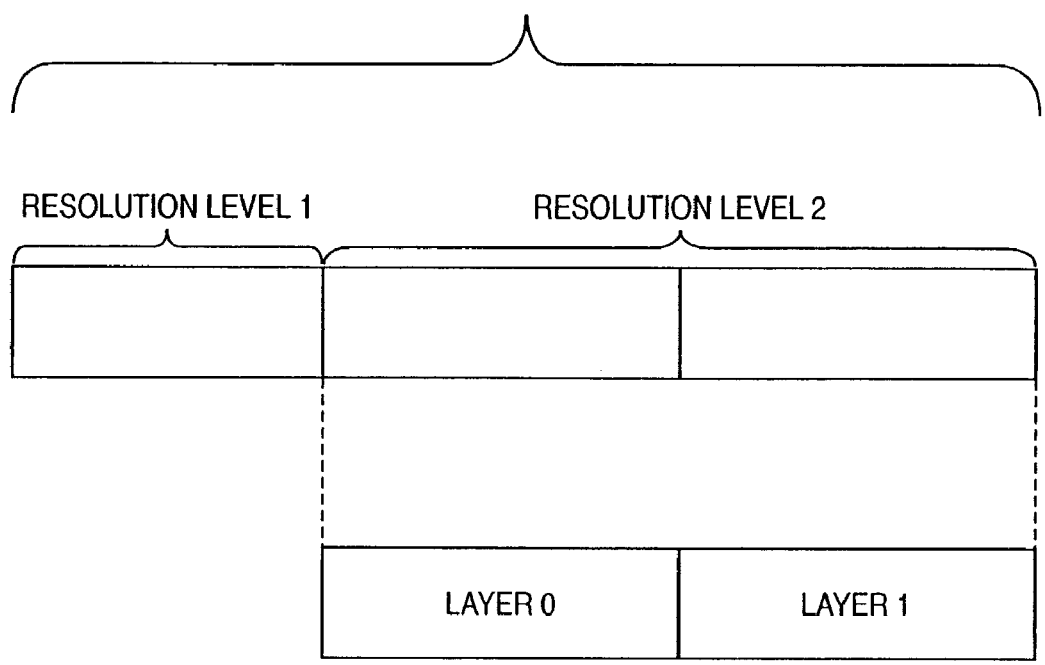
FIG. 30 shows the format of encoded image data according to the third embodiment of the present invention.

FIG. 29A shows a case wherein two layers are generated by executing a discrete wavelet transformation process once, and FIG. 29B shows an encoding method upon segmenting each subband into 48 (=8×6) code blocks. FIG. 30 shows the format of encoded image data generated by the aforementioned encoding method.

<Moving Image Playback Apparatus>

Figure 31:
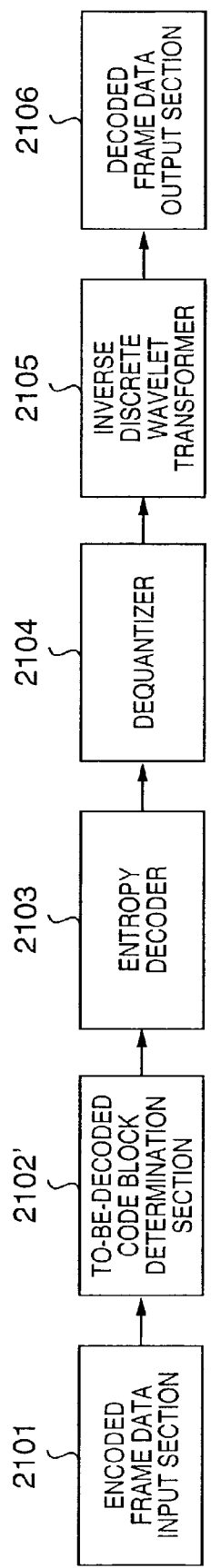
FIG. 31 is a schematic block diagram showing the arrangement of a frame data decoding unit according to the third embodiment of the present invention.

In the third embodiment, a part of code blocks corresponding to a region with a half area of an original image shown in FIG. 23B are decoded using encoded image data having the data format shown in FIG. 30. Note that the arrangement of the moving image playback apparatus of the third embodiment is substantially the same as that shown in FIG. 19, except that the arrangement and operation of the frame data decoding unit 2003 are different from those in the first embodiment. FIG. 31 shows the arrangement of the frame data decoding unit 2003 in the third embodiment. The arrangement of the frame data decoding unit 2003 is substantially the same as that shown in FIG. 20, except that a to-be-decoded code block determination section 2102' is arranged in place of the to-be-decoded tile determination section 2102.

A moving image viewer which is compatible to the quick playback mode and runs on the PC 1 will be explained first. After that, the decoding method of encoded moving image data will be explained. As for the decoding method of encoded moving image data, only differences from the decoding method in the first embodiment will be explained, and a detailed description of the same operations of that decoding method will be omitted.

Moving Image Viewer

Figure 32:
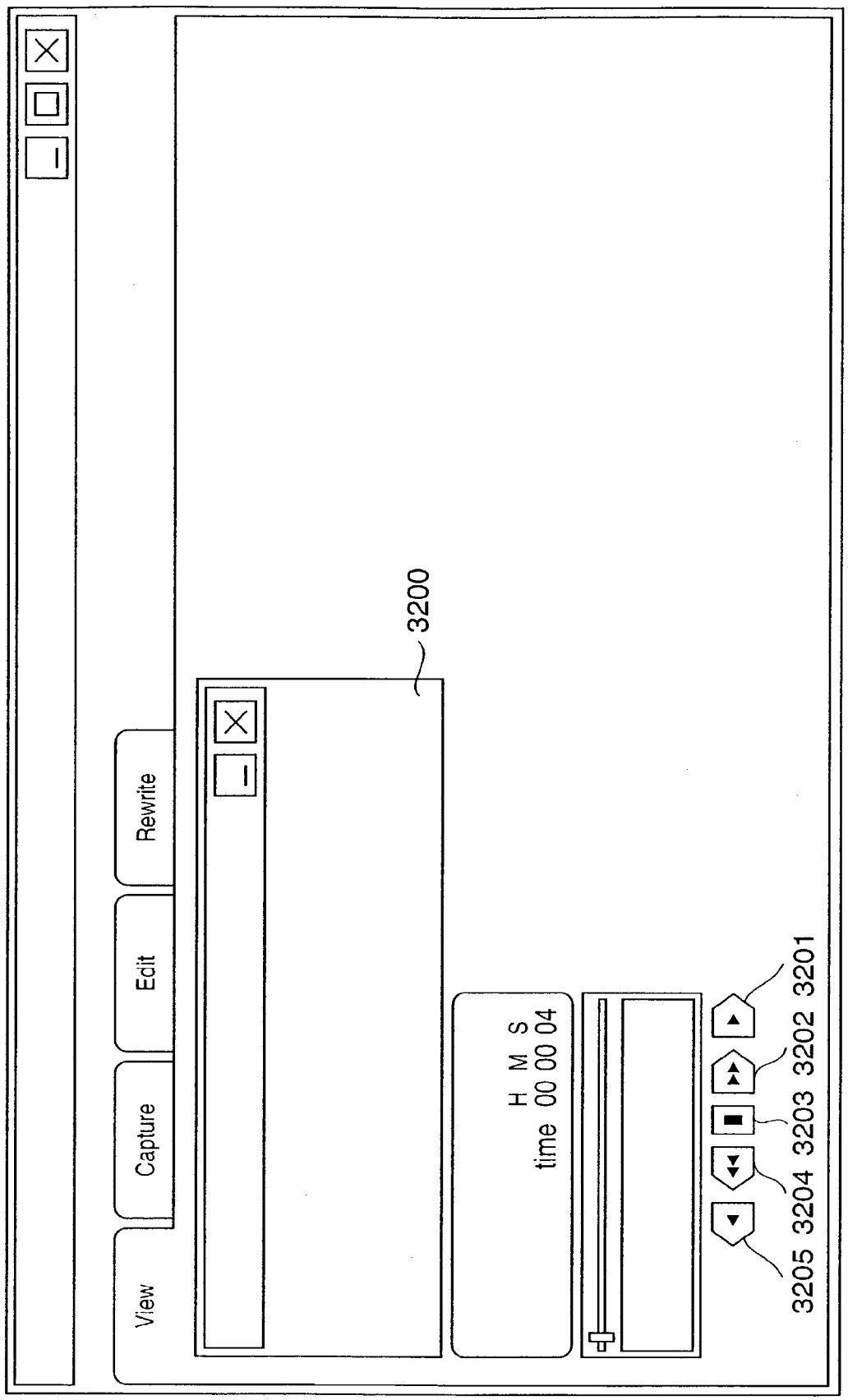
FIG. 32 is an explanatory view showing a moving image viewer according to the third embodiment of the present invention.

FIG. 32 shows an operation window displayed on the display of the PC 1. Reference numeral 3200 denotes a display area that actually displays an image stored in a display memory (not shown). In the third embodiment, an image is displayed on the area 3200, not on the full screen of the display.

Reference numerals 3201 and 3202 denote buttons used to start forward playback. The button 3201 is used to instruct normal-speed playback, and the button 3202 is used to instruct double-speed playback. Reference numeral 3203 denotes a stop button. Note that a pause button is present although it is not shown.

Reference numerals 3204 and 3205 denote buttons used to start reverse playback. The button 3204 is used to instruct reverse normal-speed playback, and the button 3205 is used to instruct reverse double-speed playback. In the third embodiment, since frames which form a moving image are independently encoded, reverse playback can be easily realized by decoding and displaying these frames in a reverse order.

Quick Playback

When the user presses the button 3202, the moving image playback apparatus 1000 executes double-speed playback. Note that "press" includes an action of clicking the button 3202 using a pointing device such as a mouse or the like. The following operations are executed in step S2207 in FIG. 21, and other processes are the same as those which have been explained with reference to FIG. 21.

Upon receiving the double-speed playback designation, the moving image playback apparatus 1000 decodes a region, which is located at the center of each image and has a half area of the image, as shown in FIG. 23B, for respective code blocks, and sends decoded data of one frame to the display every 1/60 sec.

Upon decoding for respective code blocks, the moving image playback apparatus 1000 accesses required code blocks using information embedded in the encoded moving image data. For example, when the moving image encoding apparatus embeds information by method 1, the moving image playback apparatus 1000 reads offsets of required code blocks from the main header, and then acquires the code blocks. On the other hand, when the moving image encoding apparatus embeds information by method 2, the moving image playback apparatus 1000 accesses and decodes required code blocks by the process according to the flow chart of FIG. 33. An access method when information is embedded by method 2 will be described below using FIG. 33. Note that encoded moving image data to be played back by this process has the format shown in FIGS. 29A and 29B and FIG. 30.

Figure 34:
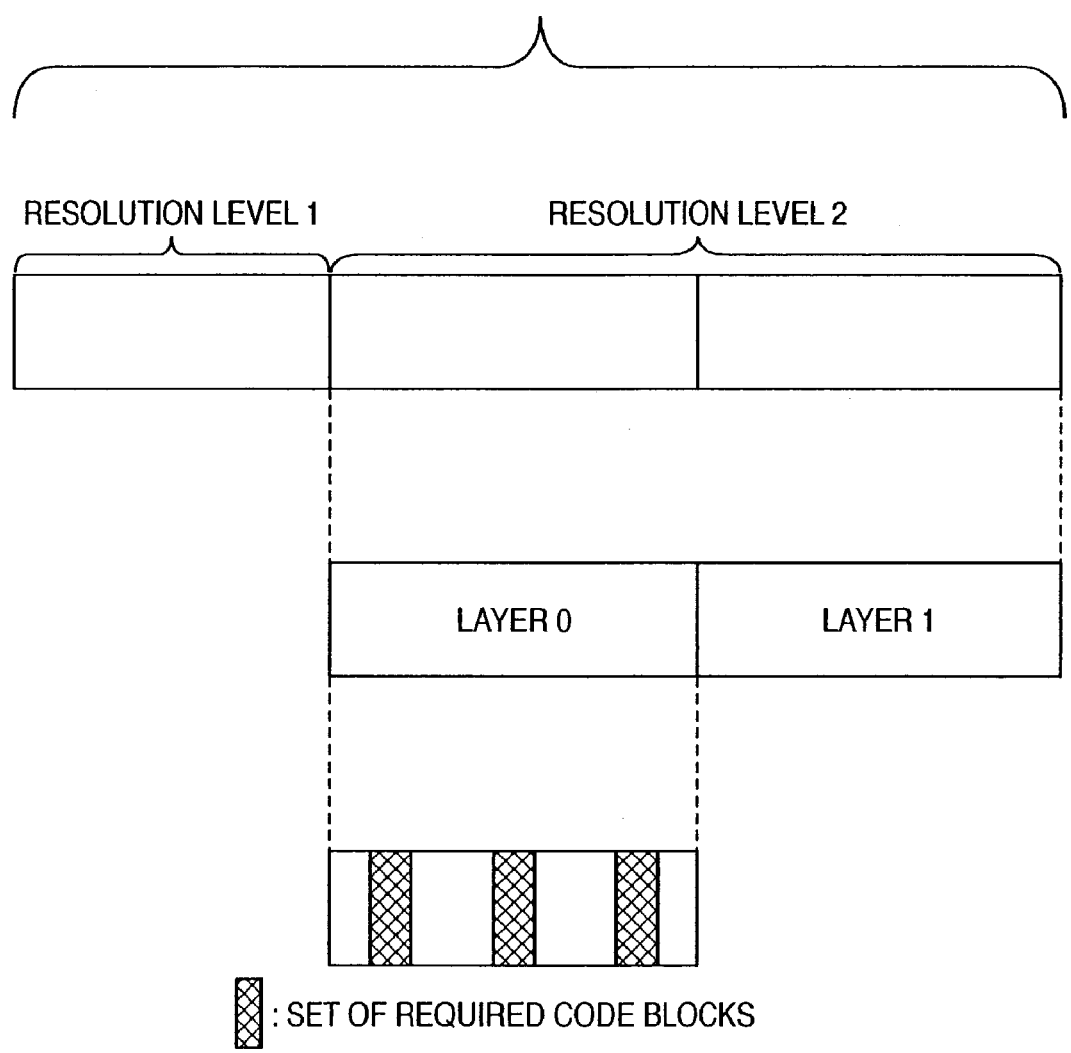
FIG. 34 is an explanatory view showing code blocks to be decoded (required code blocks) according to the third embodiment of the present invention.

The to-be-decoded code block determination section 2102' acquires the order of packets, the number of resolution levels, the number of layers, and the number of code blocks included in each packet from the main header of encoded frame data (step S3301). The section 2102' calculates the number of packets M contained in the encoded frame data on the basis of the acquired number of resolution levels and number of layers (step S3302). Furthermore, the section 2102' derives the order (positions) of required code blocks in each packet on the basis of the order of packets acquired from the main header (step S3303). FIG. 34 shows the positions of required code blocks in each packet. For example, when a packet shown in FIG. 34 stores data of HL, LH, and HH subbands, the required code blocks are distributed at three locations.

A counter indicating the number of processed packets is set to zero (step S3304), and the packet header of the first packet is analyzed (step S3305). In this packet header analysis, the code lengths of respective code blocks in the packet are acquired, and the positions of required code blocks and the head position of the next packet with respect to the head of the packet header are obtained. Using the obtained information, the section 2102' accesses the first required code block to acquire the required code blocks (step S3306), and the acquired code blocks are decoded by the entropy decoder 2103 and subsequent processing sections (step S3307).

Subsequently, the counter value is evaluated in step S3308. If the counter value is smaller than M−1(NO in step S3308), since packets to be processed still remain, the counter value is incremented by 1 (step S3309), and the flow returns to step S3305. On the other hand, if the counter value is equal to M−1 (YES in step S3308), the decoded frame data output section 2106 reconstructs a decoded image by coupling data for respective decoded code blocks (step S3310), and outputs the image to the decoded frame output unit 2004 (FIG. 19) (step S3311). The moving image playback apparatus 1000 checks if the user has issued a quick playback end designation by pressing the button 3201, 3203, or the like (step S3312). If no end designation has been issued (NO in step S3312), the apparatus 1000 starts the process for the next frame (step S3301). On the other hand, if the end designation has been issued (YES in step S3312), the apparatus 1000 ends quick playback.

As described above, according to the third embodiment, quick playback display can be smoothly executed using encoded image data, which is encoded without tile segmentation.

Fourth Embodiment

The third embodiment has explained the method of decoding and displaying encoded moving image data, which is encoded without tile segmentation, by partially accessing that data for respective code blocks in the quick playback mode. In the fourth embodiment, upon encoding, precinct data as a set of a plurality of code blocks is defined to allow easy partial decoding, and encoded image data is then generated. Furthermore, a method of smoothly executing quick playback display using the encoded moving image data generated in this way will be explained.

Note that the playback system in the fourth embodiment is basically the same as that in the first embodiment which has been explained with reference to FIG. 1. That is, assume that the PC 1 has processing performance of decoding all encoded image data having a predetermined size at a maximum of 30 fps (frames/sec), and a display is compatible to display frequencies of 30 Hz and 60 Hz. Furthermore, the playback system of the fourth embodiment makes normal playback at 30 fps.

Figure 35:
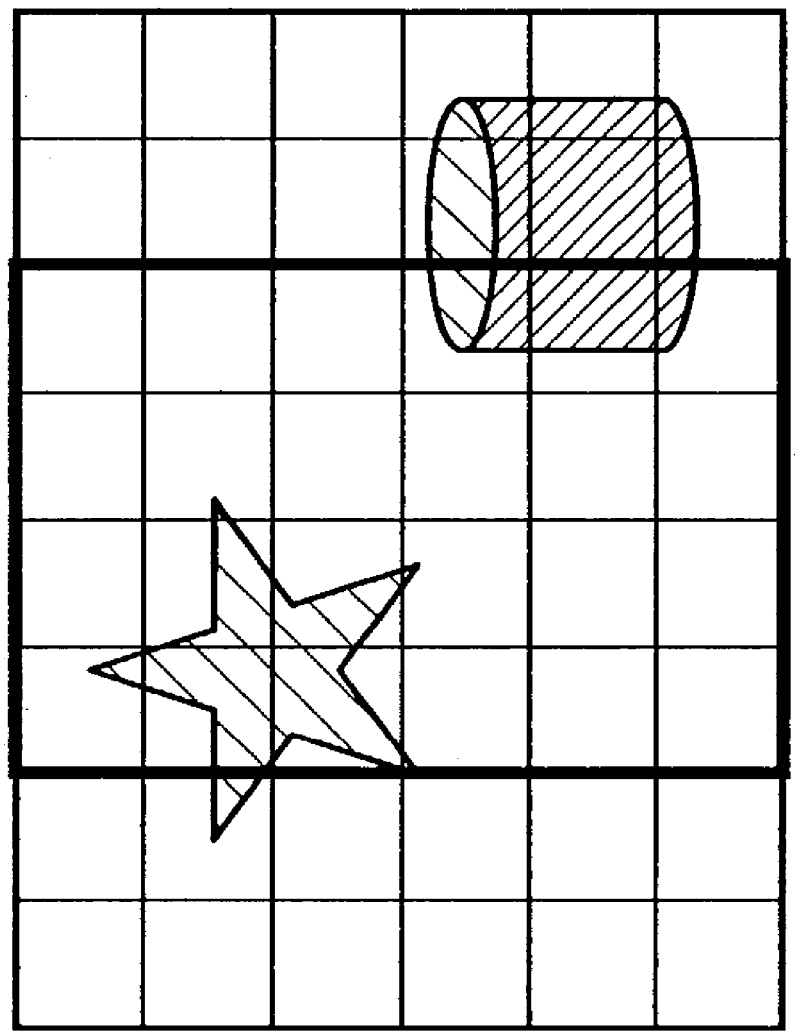
FIG. 35 is an explanatory view showing code blocks to be decoded (required code blocks) according to a fourth embodiment of the present invention.

In order to allow the PC 1 to display a smooth playback image, data corresponding to a half area of each frame image are decoded in a double-speed playback mode to substantially attain a display at 60 fps. In the fourth embodiment, a region obtained by cutting ¼ areas on the two sides is used in quick playback, as shown in FIG. 35.

A moving image encoding apparatus of the fourth embodiment will be described first.

<Moving Image Encoding Apparatus>

The moving image encoding apparatus of the fourth embodiment is basically the same as that of the first embodiment, which has been explained with reference to FIGS. 2 to 18, but does not make any tile segmentation unlike in the first embodiment. Also, the format of encoded moving image data is different from that in the third embodiment. A process as a characteristic feature of the fourth embodiment will be explained below.

Since the moving image encoding apparatus of the fourth embodiment does not execute any tile segmentation, the tile segmentation section executes a process with the number N of tiles=1. Also, precinct data is formed by collecting corresponding code blocks in respective subbands on an original image. FIGS. 36A and 36B show the concept of precinct data. FIGS. 36A and 36B exemplify a case wherein four precinct data shown in FIG. 36B are formed based on code blocks of subbands of three levels (levels 0, 1, and 2) shown in FIG. 36A to help easy understanding of the precinct data format. In FIGS. 36A and 36B, LL, HL, LH, and HH indicate the types of subbands, a suffix after the type of subband indicates the level of subband, and a suffix after the subband level indicates the number of a code block. Upon making playback shown in FIG. 35, each subband is preferably broken up into 48 (=8×6) code blocks to form 48 precinct data for respective code blocks, as shown in FIG. 26, or is preferably broken up into 12 (4×3) code blocks to form 12 precinct data. The number of levels of subbands can be changed as needed.

The moving image playback apparatus of the first embodiment decodes tiles corresponding to a half area of each frame image in the quick playback mode. However, the moving image playback apparatus of the fourth embodiment decodes precinct data corresponding to a half area of each frame image in the quick playback mode, so as to play back encoded moving image data having the aforementioned precinct format. For this purpose, the moving image encoding apparatus of the fourth embodiment embeds information required upon accessing precinct data in the encoded moving image data for each frame. As one information embedding method, a method of describing the positions of precinct data (offsets from the head of encoded image data) in a main header is available (method 3). As another method, a method of providing the following data format to encoded image data, and embedding information in correspondence with that data format is available (method 4).

Data Format

The moving image encoding apparatus of the fourth embodiment forms packets by collecting data of code blocks which belong to an identical resolution level, layer, and precinct, and appends a packet header to the head of each packet. Furthermore, the moving image encoding apparatus arranges packets in a predetermined order, and inserts a main header immediately before the first packet.

Embedding of Information

In each packet header, the code lengths of respective code blocks in the corresponding packet are written. Furthermore, data corresponding to the order of packets, the number of resolution levels, the number of layers, the number of precincts, the number of code blocks included in each packet, and the like are written in the main header.

<Moving Image Playback Apparatus>

The arrangement of the moving image playback apparatus of the fourth embodiment is the same as that shown in FIGS.

19 and 31, but the operation of the frame data decoding unit 2003 is different from that of the third embodiment. The operation of the moving image playback apparatus of the fourth embodiment will be described below with reference to the flow chart of FIG. 37. Note that the same step numbers in FIG. 37 denote the same processes as those in FIG. 33, and a detailed description thereof will be omitted.

In the fourth embodiment, it is assumed that code blocks corresponding to a half area in a bold frame of each frame image are partially decoded, as shown in FIG. 35.

Figure 37:
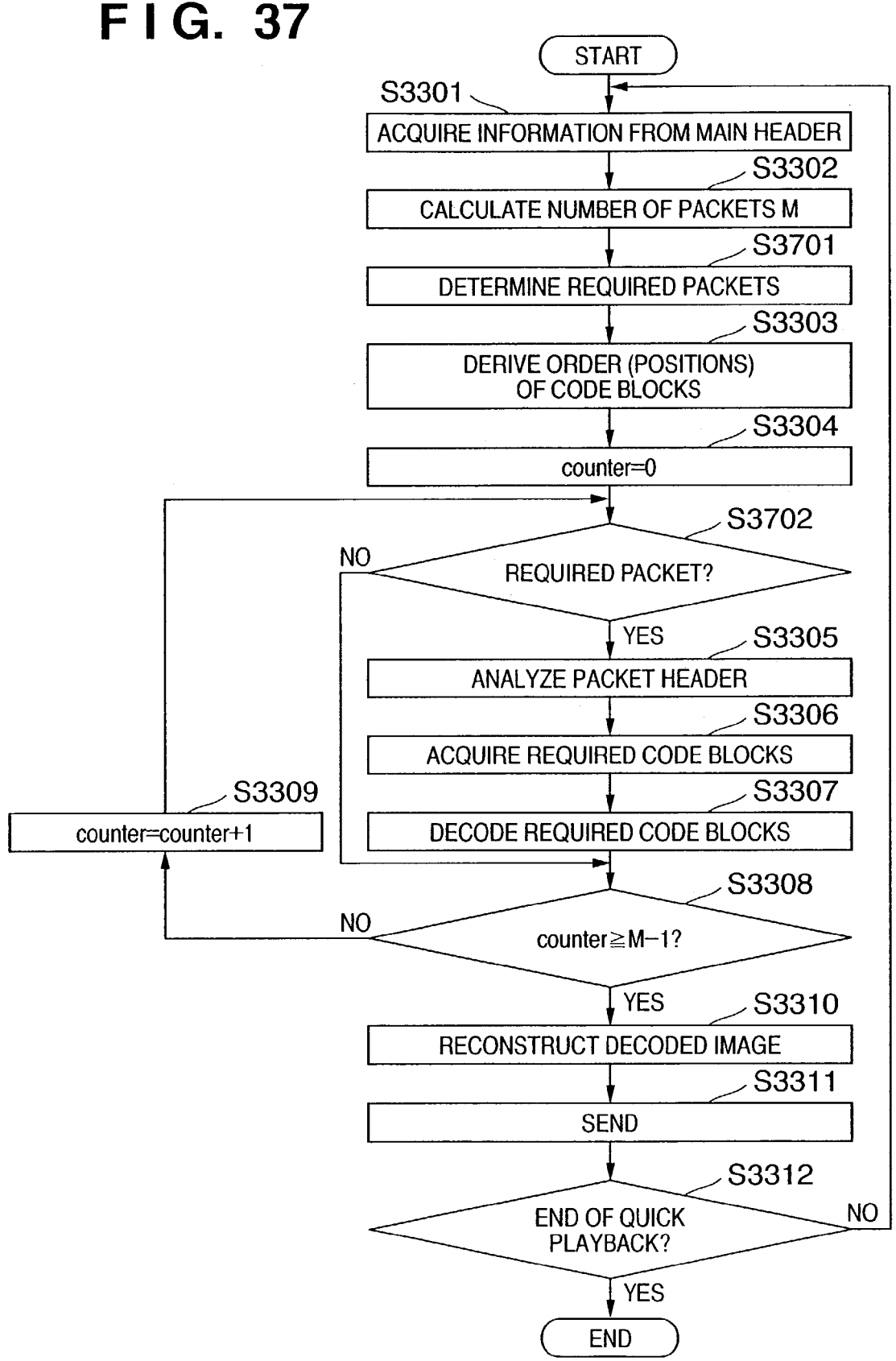
FIG. 37 is a flow chart showing a frame data decoding process in a quick playback mode according to the fourth embodiment of the present invention.

FIG. 37 is a flow chart showing the decoding method of encoded frame data, which is encoded by method 4. In FIG. 37, the process in step S3701 is inserted between steps S3302 and S3303 in FIG. 33 of the third embodiment, and step S3702 is inserted between steps S3304 and S3305.

Figure 38:
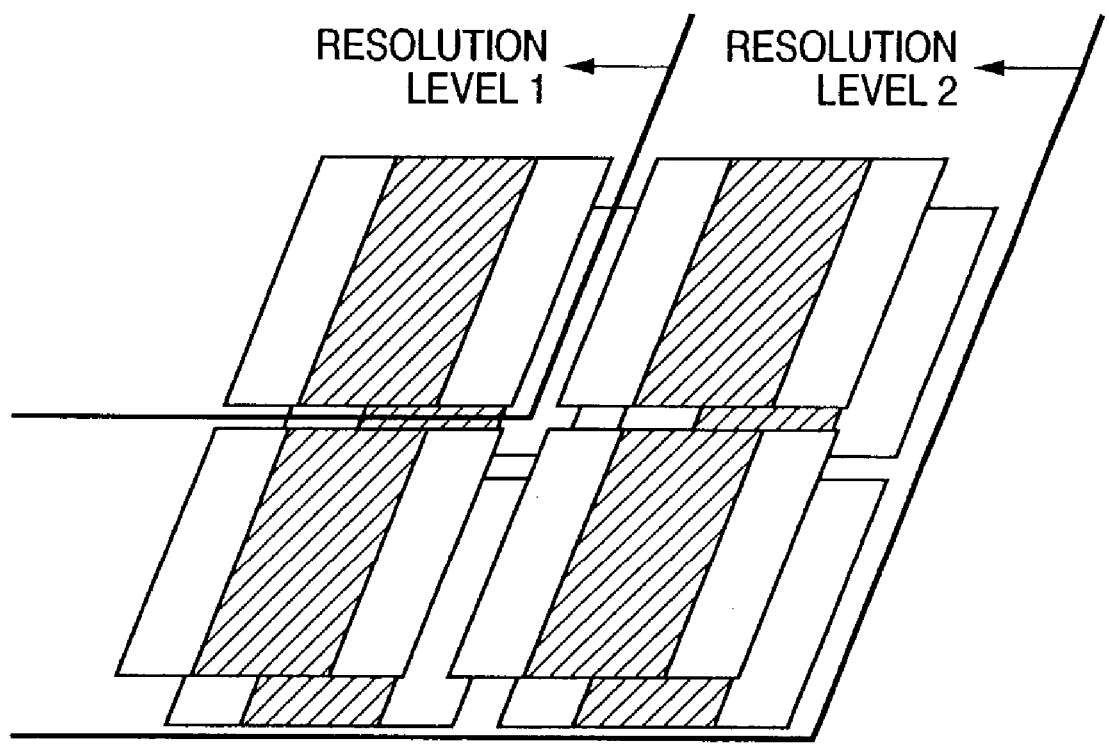
FIG. 38 shows required packets according to the fourth embodiment of the present invention.

Referring to FIG. 37, packets (required packets) required for quick playback of M packets which form encoded frame data are determined in step S3701. Note that the required packets are those which belong to precincts indicated by hatching in FIG. 38. It is checked in step S3702 if the packet to be processed is the required packet determined in step S3701. If the packet to be processed is the required packet (YES in step S3702), the flow advances to step S3305 to execute the process that has been explained in the third embodiment. On the other hand, if the packet to be processed is not the required packet (NO in step S3702), the flow jumps to step S3308 to compare the counter value indicating the packet number with M−1. If the counter value is smaller than M−1, the counter value is incremented by 1 in step S3309, and the flow returns to step S3702; if the counter value is equal to or larger than M−1, the flow advances to step S3310.

As described above, according to the fourth embodiment, quick playback display can be smoothly executed using precinct data.

In the fourth embodiment, the right and left ¼ regions of an image are not decoded. However, precinct data to be decoded can be arbitrarily set, and a desired region can undergo quick decoding.

Fifth Embodiment

In the first to fourth embodiments, quick playback is realized by decoding data corresponding to a given spatial portion. In the fifth embodiment, data to be decoded is determined for each layer, and all data of a layer to be decoded are decoded irrespective of their spatial positions. This method will be explained below.

A moving image encoding apparatus of the fifth embodiment encodes each frame that forms a moving image by the same method as that described in the first embodiment. However, the moving image encoding apparatus of the fifth embodiment adopts a two-layered format upon encoding frames, and sets the two layers to have nearly the same code sizes.

A moving image playback apparatus of the fifth embodiment acquires, decodes, and displays the uppermost layer of each frame in the quick playback mode.

As described above, according to the fifth embodiment, quick playback display can be smoothly executed using layers.

Other Embodiment

In the first to fifth embodiments, discrete wavelet transformation is used in sequence transformation of frame data. However, the present invention is not limited to such specific algorithm. For example, discrete cosine transformation or the like may be used in sequence transformation.

Also, quick playback may be implemented using a plurality of data units selected from tiles, code blocks, precincts, and layers described in the first to fifth embodiments.

The present invention can be applied to a system constituted by a plurality of devices (e.g., host computer, interface, reader, scanner, camera head) or to an apparatus comprising a single device (e.g., copying machine, facsimile machine, digital camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 25:
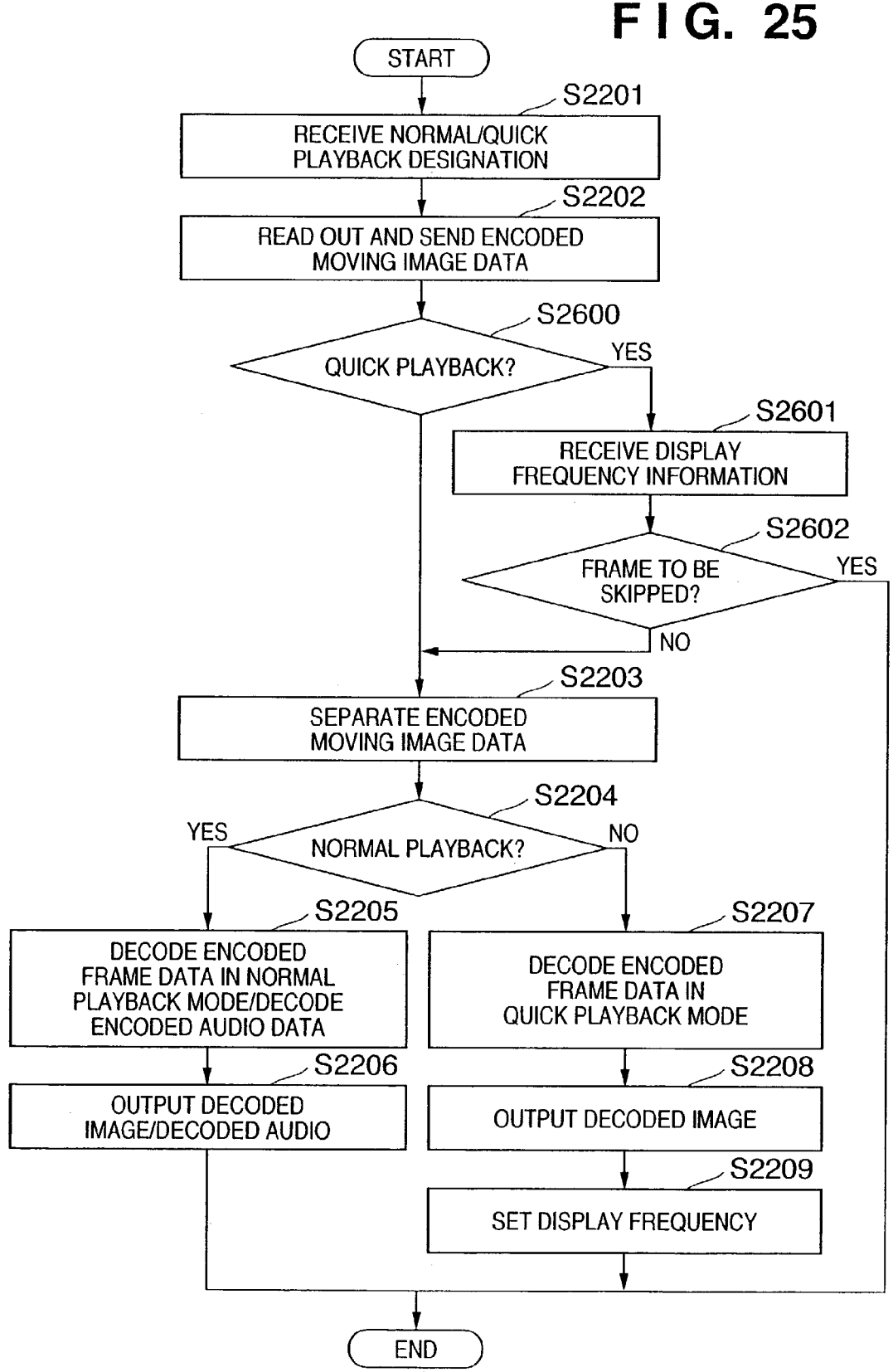
FIG. 25 is a flow chart of a moving image data decoding process executed by a moving image playback apparatus according to a second embodiment of the present invention.
Figure 33:
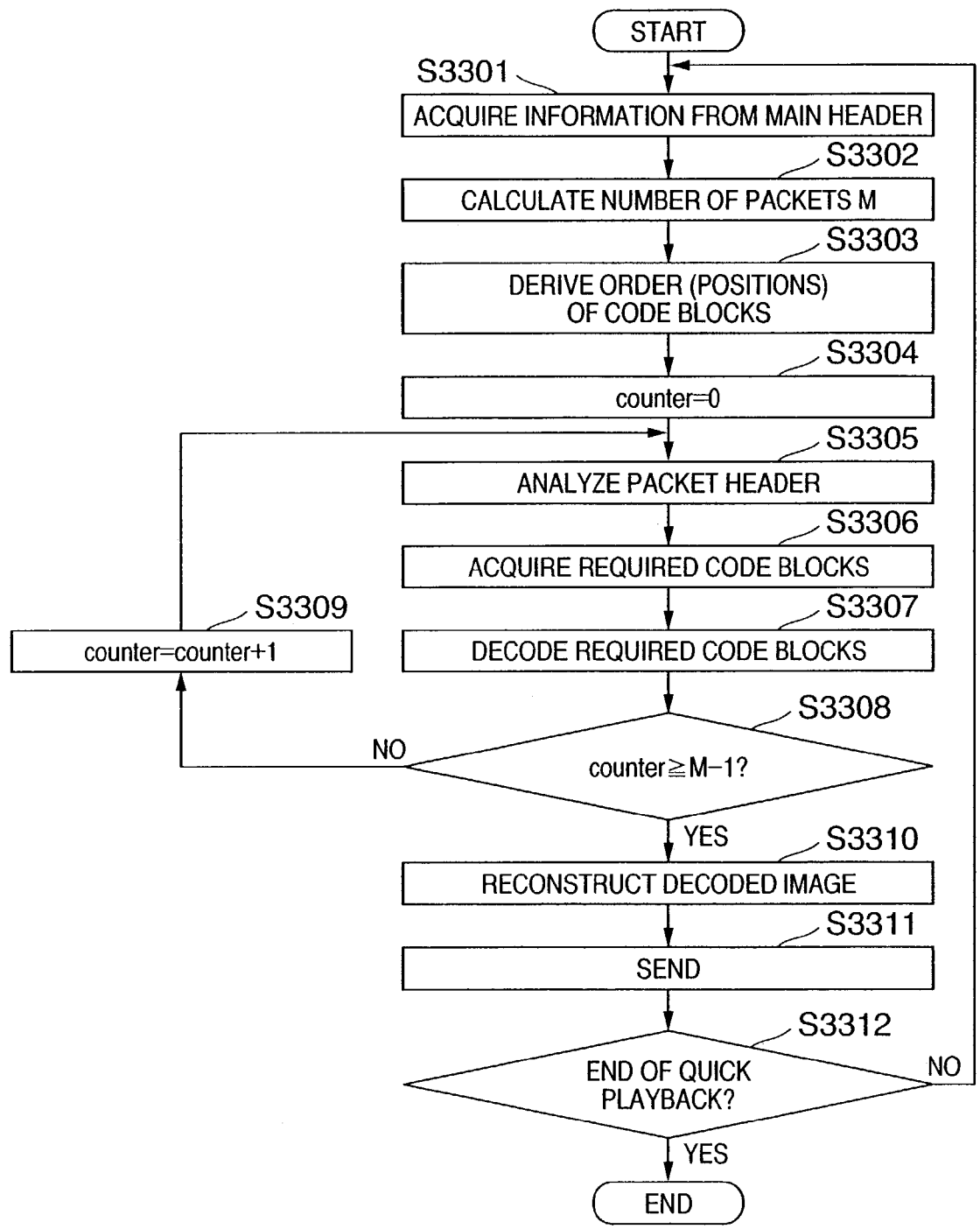
FIG. 33 is a flow chart showing a frame data decoding process in a quick playback mode according to the third embodiment of the present invention.

In a case where the present invention is applied to the aforesaid storage medium, the storage medium stores program codes corresponding to the flowcharts shown in FIG. 21 or 25 and FIG. 22 and/or FIG. 33 or 37 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image playback apparatus for playing back digital moving image data, comprising:
a first designation unit for designating playback of an image at a first frame rate;
a second designation unit for designating playback of an image at a second frame rate higher than the first frame rate;
a selection unit which selects, among frame images represented by the digital moving image data, frame images to be decoded and a portion to be decoded of the selected frame images to be decoded when the playback at the second frame rate is designated;

a processing unit which decodes digital moving image data corresponding to the selected portion to be decoded of the selected frame images to be decoded and executes a playback process for display of the decoded digital moving image data;

a display processing unit which makes display of the processed digital moving image data by said processing unit on a display whose display frequency is selectable from a plurality of display frequencies; and an acquisition unit which acquires information relating to the display frequency or frequencies to which the display corresponds, wherein, in a case where the second frame rate and the acquired display frequency to which the display corresponds do not match, said selection unit selects the frame images to be decoded by skipping a part of frame images and the portion to be decoded in accordance with the display frequency or frequencies to which the display corresponds.

2. The apparatus according to claim 1, wherein said selection unit changes the portion to be decoded at a predetermined cycle.

3. The apparatus according to claim 1, wherein said selection unit selects the portion to be decoded at a ratio corresponding to substantially a reciprocal of a ratio of the second frame rate or the display frequency or frequencies to which the display corresponds with respect to the first frame rate.

4. The apparatus according to claim 1, wherein the digital moving image data is data for each of segmented regions obtained by segmenting an image into a plurality of regions, and said selection unit selects the portion to be decoded from the segmented regions for each frame image.

5. The apparatus according to claim 1, wherein the digital moving image data is data for each of segmented regions obtained by segmenting a frequency domain of an image into a plurality of regions, and said selection unit selects the portion to be decoded from the segmented regions for each frame image.

6. The apparatus according to claim 1, wherein the digital moving image data is data for each region obtained by segmenting a frequency domain of an image into a plurality of regions and collecting obtained segmented regions, and said selection unit selects the portion to be decoded from the segmented regions for each frame image.

7. The apparatus according to claim 1, wherein the first frame rate is a frame rate used upon making normal playback.

8. The apparatus according to claim 1, wherein said processing unit executes a playback process of image and audio data at the first frame rate, and executes a playback process of image data alone at the second frame rate.

9. The apparatus according to claim 1, further comprising an output unit which outputs an image played back at the first or second frame rate, wherein said display processing unit sets a display frequency of the display in accordance with a frame rate of the image output from said output unit.

10. An image playback method for playing back digital moving image data, comprising:

a designation step of receiving a playback designation of an image at a first frame rate or a second frame rate higher than the first frame rate;

a selection step of selecting, when the playback at the second frame rate is designated, among frame image represented by the digital moving image data, frame images to be decoded and a portion to be decoded of the selected frame images to be decoded;

a processing step of decoding digital moving image data corresponding to the selected portion to be decoded of the selected frame images to be decoded and executing a playback process for display of the decoded digital moving image data;

a display processing step of making display of the digital moving image data processed in said processing step on a display whose display frequency is selectable from a plurality of display frequencies; and an acquisition step of acquiring information relating to the display frequency or frequencies to which the display corresponds, wherein, in a case where the second frame rate and the acquired display frequency to which the display corresponds do not match, said selection step includes selecting the frame images to be decoded by skipping a part of frame images and the portion to be decoded in accordance with the display frequency or frequencies to which the display corresponds.

11. A storage medium storing, in executable form, a program executable by a data processing apparatus, said program including program codes for analyzing an image playback method described in claim 10.

* * * * *